(12) United States Patent
Ito

(10) Patent No.: US 7,898,707 B2
(45) Date of Patent: Mar. 1, 2011

(54) NORMALIZATION METHOD, AND MULTI-DIMENSIONAL INTERPOLATION METHOD AND APPARATUS

(75) Inventor: Tadayuki Ito, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 896 days.

(21) Appl. No.: 11/464,223

(22) Filed: Aug. 14, 2006

(65) Prior Publication Data
US 2007/0047035 A1    Mar. 1, 2007

(30) Foreign Application Priority Data

Aug. 31, 2005    (JP) .................. 2005-252676

(51) Int. Cl.
*H04N 1/46* (2006.01)
*H04N 1/40* (2006.01)
*G06F 7/38* (2006.01)

(52) U.S. Cl. .................. 358/525; 358/3.23; 708/290

(58) Field of Classification Search .................. 358/525, 358/530, 535, 539, 3.23; 708/290, 3, 5, 131, 708/137, 200, 205; 382/166, 167, 254, 256
See application file for complete search history.

(56) References Cited

U.S. PATENT DOCUMENTS

| | | | | |
|---|---|---|---|---|
| 5,175,701 A * | 12/1992 | Newman et al. | ............... | 708/290 |
| 5,666,437 A * | 9/1997 | Vondran, Jr. | .................. | 382/167 |
| 5,715,376 A * | 2/1998 | Nakayama | ..................... | 358/525 |
| 5,768,410 A * | 6/1998 | Ohta et al. | ..................... | 358/525 |
| 5,809,181 A * | 9/1998 | Metcalfe | ........................ | 382/276 |
| 6,256,653 B1 * | 7/2001 | Juffa et al. | ..................... | 708/290 |
| 6,373,980 B2 * | 4/2002 | Ohta | ............................. | 382/167 |
| 6,415,065 B1 * | 7/2002 | Miyake | ........................ | 382/300 |
| 6,707,463 B1 * | 3/2004 | Gibson et al. | ................. | 345/619 |
| 6,809,740 B1 * | 10/2004 | Weed | ............................ | 345/589 |
| 6,833,876 B1 * | 12/2004 | Pirjaberi | ...................... | 348/674 |
| 6,975,331 B2 * | 12/2005 | Kletter | .......................... | 345/604 |
| 7,382,489 B2 * | 6/2008 | Curry et al. | .................... | 358/525 |

FOREIGN PATENT DOCUMENTS

| | | |
|---|---|---|
| JP | 08-202533 | 8/1996 |
| JP | 2004-252616 | 9/2004 |

* cited by examiner

*Primary Examiner* — King Y Poon
*Assistant Examiner* — Vincent R Peren
(74) *Attorney, Agent, or Firm* — Cowan, Liebowitz & Latman, P.C.

(57) ABSTRACT

In processing for normalizing a P-bit input digital signal, which is expressed by binary notation, to $2^M - 1$ ($0 < M \leq P$) tones, upper M bits of the input digital signal are repetitively concatenated until P bits are reached, a concatenated signal obtained as a result of concatenation is compared with the input digital signal, and a value indicated by the upper M bits or a value obtained by subtracting 1 from the value indicated by the upper M bits is determined as a normalized value depending on the comparison result.

24 Claims, 16 Drawing Sheets

FIG. 15 (PRIOR ART)

| CONDITION | | QUANTIZED VALUE | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|---|---|
| | | INPUT TONE | | | | | | | | | | | | | | | | |
| 3 DIVISIONS <4 REFERENCE POINTS> | 0~255 (8bit) | BOUNDARY VALUE | 0 | 85 | 170 | 255 | | | | | | | | | | | | |
| | | SECTION WIDTH | | 85 | 85 | 85 | | | | | | | | | | | | |
| | 0~511 (9bit) | BOUNDARY VALUE | 0 | 170 | 341 | 511 | | | | | | | | | | | | |
| | | SECTION WIDTH | | 170 | 171 | 170 | | | | | | | | | | | | |
| | 0~1023 (10bit) | BOUNDARY VALUE | 0 | 341 | 682 | 1023 | | | | | | | | | | | | |
| | | SECTION WIDTH | | 341 | 341 | 341 | | | | | | | | | | | | |
| 7 DIVISIONS <8 REFERENCE POINTS> | 0~255 (8bit) | BOUNDARY VALUE | 0 | 36 | 73 | 109 | 146 | 182 | 219 | 255 | | | | | | | | |
| | | SECTION WIDTH | | 36 | 37 | 36 | 37 | 36 | 37 | 36 | | | | | | | | |
| | 0~511 (9bit) | BOUNDARY VALUE | 0 | 73 | 146 | 219 | 292 | 365 | 438 | 511 | | | | | | | | |
| | | SECTION WIDTH | | 73 | 73 | 73 | 73 | 73 | 73 | 73 | | | | | | | | |
| | 0~1023 (10bit) | BOUNDARY VALUE | 0 | 146 | 292 | 438 | 585 | 731 | 877 | 1023 | | | | | | | | |
| | | SECTION WIDTH | | 146 | 146 | 146 | 147 | 146 | 146 | 146 | | | | | | | | |
| 15 DIVISIONS <16 REFERENCE POINTS> | 0~255 (8bit) | BOUNDARY VALUE | 0 | 17 | 34 | 51 | 68 | 85 | 102 | 119 | 136 | 153 | 170 | 187 | 204 | 221 | 238 | 255 |
| | | SECTION WIDTH | | 17 | 17 | 17 | 17 | 17 | 17 | 17 | 17 | 17 | 17 | 17 | 17 | 17 | 17 | 17 |
| | 0~511 (9bit) | BOUNDARY VALUE | 0 | 34 | 68 | 102 | 136 | 170 | 204 | 238 | 273 | 307 | 341 | 375 | 409 | 443 | 477 | 511 |
| | | SECTION WIDTH | | 34 | 34 | 34 | 34 | 34 | 34 | 34 | 35 | 34 | 34 | 34 | 34 | 34 | 34 | 34 |
| | 0~1023 (10bit) | BOUNDARY VALUE | 0 | 68 | 136 | 205 | 273 | 341 | 409 | 477 | 546 | 614 | 682 | 750 | 818 | 887 | 955 | 1023 |
| | | SECTION WIDTH | | 68 | 68 | 69 | 68 | 68 | 68 | 68 | 69 | 68 | 68 | 68 | 68 | 69 | 68 | 68 |

NORMALIZATION METHOD, AND MULTI-DIMENSIONAL INTERPOLATION METHOD AND APPARATUS

BACKGROUND OF THE INVENTION

1. Field of the Invention

The present invention relates to a normalization method, a multi-dimensional interpolation method, and an apparatus.

2. Description of the Related Art

Color Reproduction Between Input and Output Devices

In recent years, scanners, video cameras, and the like have prevailed as input devices. Also, various color printers using an ink-jet system, dye sublimation system, electrophotographic system, and the like have prevailed as output devices. In general, these color input and output devices respectively have unique color spaces. For this reason, even when a color image scanned by an arbitrary scanner is transferred to and printed by a color printer intact, the colors of the printed color image rarely match those of the original color image scanned by the scanner.

In order to solve such problems associated with color reproducibility between devices for color images and the like, processing (to be referred to as "color space conversion" hereinafter) for converting a color space of an input device into that of an output device is required. For this purpose, the input and output devices normally incorporate a color space conversion function so as to improve the color reproduction capability between the input and output devices.

Note that the color space conversion indicates a series of entire image processes such as input γ (gamma) correction, luminance-density conversion, masking, black generation, UCR, output γ correction, and the like, or only some processes of them in some cases.

As a color space conversion method, digital image signals of three colors of an input device are simultaneously referred to and are converted into digital image signals of three or four colors of an output device.

The three colors of the input device indicate, e.g., the colors red, blue, and green (the term "RGB" will be used hereinafter to refer to these colors collectively). The three colors of the output device indicate, e.g., the colors cyan, magenta, and yellow (the term "CMY" will be used hereinafter to refer to these colors collectively). The four colors of the output device indicate, e.g., the colors cyan, magenta, yellow, and black (the term "CMYK" will be used hereinafter to refer to these colors collectively). In case of a copying machine of an electrophotographic system, since the engine characteristics of a printer change along with an elapse of running hours, periodic calibration is required. For this reason, in such case, conversion from the four colors (e.g., "CMYK") of the output device into the four colors (e.g., "CMYK") of the output device is also required.

Overview of Color Space Conversion Method

As a means for implementing the color space conversion, a method of storing conversion results in a memory in the form of a lookup table (to be abbreviated as "LUT" hereinafter), and outputting conversion results from that LUT in response to input digital image signals is available.

The color space conversion method using the LUT often uses interpolation calculations together to reduce the memory size of the LUT. The color space conversion of input digital image signals of three colors is implemented using three-dimensional interpolation calculations. Also, the color space conversion of input digital image signals of four colors is implemented using four-dimensional interpolation calculations.

The color space conversion of input digital image signals of three colors, which uses both a three-dimensional lookup table (to be abbreviated as "3D-LUT" hereinafter) and three-dimensional interpolation calculations will be described below.

Details of Color Space Conversion Method

FIG. 12 shows functional blocks that implement color space conversion by three-dimensional interpolation calculations using a 3D-LUT. Using these functional blocks, an interpolated value 1235 can be obtained for input digital image signals (R, G, B) 1205.

For acquiring the interpolated value 1235, the input digital image signals (R, G, B) 1205 are divided into upper signals 1215 and lower signals 1218 by a data division unit 1210. The upper signals 1215 of the three digital image signals are considered as integer coordinates intg_coord of a color space, so as to select a unit solid used in the three-dimensional interpolation calculations.

Unit solids obtained by dividing a color space (RGB space) of a three-dimensional input by a limited value in respective axis directions is shown in reference mark 'a' of FIG. 13. In reference mark 'a' of FIG. 13, a painted part indicates a unit solid selected by the upper signals 1215 so as to be used in the three-dimensional interpolation calculations.

Note that data after color space conversion corresponding to respective vertices (RD0 to RD7) of a unit solid in reference mark 'b' of FIG. 13 are pre-stored in a 3D-LUT 1220 in FIG. 12. These data will be referred to as reference values RD 1225 hereinafter (shown in FIG. 12).

When the reference values RD 1225 corresponding to the respective vertices of the selected unit solid are read out from the 3D-LUT 1220, they are input to an interpolation calculation unit 1230.

On the other hand, the lower signals 1218 of the three digital image signals are considered as fractional coordinates (coordinates of fractional part) frac_coord of the color space, and are used to calculate weighting coefficients (interpolation coefficients) g of the three-dimensional interpolation calculations. In the functional blocks shown in FIG. 12, the fractional coordinates frac_coord themselves are used as the weighting coefficients (interpolation coefficients) g.

The interpolation calculation unit 1230 calculates the interpolated value X 1235 as an output of the functional blocks in FIG. 12 by interpolation calculations (product-sum calculations in most cases) of the reference values RD 1225 and weighting coefficients (interpolation coefficients) g. Interpolation calculation formulas in case of cubic interpolation calculations are as follows (see reference mark 'b' of FIG. 13).

equations (1) fi: fractional coordinate frac_coord[i] (i: input axis number)
Si: section width (interval between neighboring reference points RD)
gi: weighting coefficient (interpolation coefficient)

$$gi = \frac{fi}{Si}$$

$$t_0 = RD_0 + (RD_1 - RD_0) \times g_0$$

$$t_1 = RD_2 + (RD_3 - RD_2) \times g_0$$

$$t_2 = t_0 + (t_1 - t_0) \times g_1$$

$$t_3 = RD_4 + (RD_5 - RD_4) \times g_0$$

$$t_4 = RD_6 + (RD_7 - RD_6) \times g_0$$

$t_5 = t_3 + (t_4 - t_3) \times g_1$ $X = t_2 + (t_5 - t_2) \times g_2$

Overview of Calculation Methods of Integer Coordinates, Fractional Coordinates, and Weighting Coefficients As a method of calculating the integer coordinates intg_coord of the color space from the upper signals 1215, and a method of calculating the fractional coordinates frac_coord and weighting coefficients (interpolation coefficients) g from the lower signals 1218 roughly have two different prior arts. The difference between these two prior arts lies in that the reference values RD 1225 present on the respective axes (R, G, B) of the color space shown in reference mark 'a' of FIG. 13 are defined by $2^M$ points ((M-th power of 2) points) or $2^M+1$ points ((M-th power of 2+1) points).

A case wherein the reference values RD 1225 are defined by $2^M$ points will be referred to as prior art 1, a case wherein the reference values RD 1225 are defined by $2^M+1$ points will be referred to as prior art 2, and these prior arts will be described below. For the sake of simplicity, linear interpolation calculations will be exemplified below in place of three-dimensional interpolation calculations, as shown in reference marks 'a' and 'b' of FIG. 14. Since the following description is established for each of input axes of N-dimensional interpolation calculations, a description of the linear interpolation calculations suffices.

Calculation Method Using Prior Art 1 (When Reference Values are Defined by $2^M$ Points)

Prior art 1 will be described below using reference mark 'a' of FIG. 14. An advantage of prior art 1 is that since $2^M$ points of reference values RD are allocated along an axis, the total number of reference values RD stored in the LUT assumes a value of the power of 2.

In general, the LUT is implemented as a memory. Primarily, since the memory becomes the most efficient circuit when the number of entries assumes a value of the power of 2, hardware of the LUT of prior art 1 can be easily formed, thus providing the advantage of prior art 1. Conversely, prior art 1 suffers the following disadvantage.

When each of the input digital image signals (R, G, B) 1205 is expressed by an input tone P [bits], it has tones ranging from 0 to $2^P-1$, and a maximum tone is $2^P-1$. An input digital image signal data_in shown in reference mark 'a' of FIG. 14 indicates an input digital image signal corresponding to one axis of the input digital image signals (R, G, B) 1205.

In prior art 1, since the reference values of $2^M$ points are allocated on tones 0 to $2^P-1$ at nearly equal intervals along the axis, $2^M-1$ intervals (to be referred to as sections hereinafter) between neighboring reference values RD are formed. The length (section width S) of one section assumes a value obtained by dividing the maximum tone $2^P-1$ by the number $2^M-1$ of sections.

As can be understood from reference mark 'a' of FIG. 14, if the input digital image signal data_in exists between boundary values 2S and 3S, as shown in reference mark 'a' of FIG. 14, reference points required for the linear interpolation calculations are RD[2S] and RD[3S].

An integer coordinate intg_coord of the color space at that time assumes the boundary value 2S, and a fractional coordinate frac_coord of the color space assumes a value obtained by subtracting the boundary value 2S from the input digital image signal data_in (i.e., the remainder of the above division).

With the method of prior art 1, since the number $2^M-1$ of sections is always an odd value, the integer coordinate intg_coord of the color space cannot be calculated by a simple bit operation. Hence, in prior art 1, in general, the input digital image signal data_in is divided by the section width S, the quotient of the division result is used as an integer coordinate intg_coord of the color space, and the remainder of the division result is used as a fractional coordinate frac_coord of the color space.

For this purpose, prior art 1 requires a divider to calculate the integer coordinate intg_coord and fractional coordinate frac_coord of the color space, which are required for the interpolation calculations.

Also, depending on combinations of a bit depth P [bit] of the input digital image signal data_in and the number $2^M$ of reference values RD of each axis, a problem shown in FIG. 15 is posed.

More specifically, when the maximum tone $2^P-1$ is divisible by the number $2^M-1$ of sections (the remainder='0'), all sections have an equal section width S. However, when the maximum tone $2^P-1$ is indivisible by the number $2^M-1$ of sections, sections having section widths S different from other sections are formed like hatched sections in FIG. 15. For this reason, boundary values and section widths of respective sections must be pre-stored in storage means such as a register or the like, and the input digital image signal data_in must be compared with all boundary values to calculate an integer coordinate intg_coord of the color space based on their comparison result. As a result, this comparison processing with boundary values imposes a heavier calculation load along with increasing the number of reference values of each axis.

Calculation Method Using Prior Art 2 (When Reference Values are Defined by $2^M+1$ Points)

Prior art 2 will be described below using reference mark 'b' of FIG. 14. An advantage of prior art 2 is that no divider is required unlike in prior art 1 above to calculate the integer coordinate intg_coord and fractional coordinate frac_coord of the color space which are required for the interpolation calculations. Another advantage is that no processing for comparing the input digital image signal data_in with all boundary values is required.

As shown in reference mark 'b' of FIG. 14, in prior art 2, $2^M+1$ points of reference values RD are allocated along the axis on tones 0 to $2^P-1$ at equal intervals. For this reason, the number of intervals (sections) between neighboring reference values RD is $2^M$. The length (section width S) of one section inevitably assumes a value obtained by dividing the maximum tone $2^P-1$ by the number $2^M$ of sections. However, an integer coordinate intg_coord of the color space can be calculated by making a right shift calculation of the input digital image signal by P−M bits. At this time, a fractional coordinate frac_coord of the color space is lower P−M bits of the input digital image signal.

Note that the fractional coordinate frac_coord of the color space must be carefully calculated in prior art 2. Since the maximum tone is not $2^P$ but $2^P-1$, the first ("1") to "$2^M-1$"-th sections have a section width S of $2^{P-M}$. Also, the number of tones of the fractional coordinate frac_coord becomes $2^{P-M}$ tones. However, the section width S of the last "$2^M$"-th section becomes $2^{P-M}-1$, and the number of tones of the fractional coordinate frac_coord becomes $2^{P-M}-1$.

For this reason, the fractional coordinate frac_coord of the last "$2^M$"-th section must be adjusted to other sections by multiplying it by $2^{P-M}/(2^{P-M}-1)$.

In prior art 2, since $2^M+1$ points of reference values RD are allocated along the axis, the total number of reference values RD stored in the LUT does not assume a value of the power of 2. For this reason, unlike in prior art 1, when the LUT is configured by a memory, it does not become an efficient circuit.

In an N-dimensional interpolation apparatus, the total number of reference values RD required for respective axes is preferably as small as possible since the circuit scale of the LUT exponentially increases with increasing the number N of dimensions of the input digital image signal. The total number of reference value RD of prior art 1 is $(2^M)^N$, while that of prior art 2 is $(2^M+1)^N$. For this reason, prior art 2 requires a larger circuit scale of the LUT than prior art 1. Also, prior art 1 requires a divider in place of a simple bit shift calculation in prior art 2. However, in a 3- or 4-dimensional interpolation circuit, the circuit scale of the LUT configured by the memory occupies the majority of that of the overall apparatus. For this reason, although the calculation contents are complicated, prior art 1 has a smaller circuit scale.

As described above, prior arts 1 and 2 have opposite advantages and disadvantages. For this reason, when the circuit scale of the LUT is to be reduced, a multi-dimensional interpolation apparatus is implemented by prior art 1. When the calculation processing is to be simplified, a multi-dimensional interpolation apparatus is implemented by prior art 2.

SUMMARY OF THE INVENTION

It is an object of the present invention to provide a normalization method and a multi-dimensional interpolation method and apparatus, which have a small circuit scale and light calculation processing.

It is another object of the present invention to provide a method of normalizing a P-bit input digital signal, which is expressed by binary notation, to $2^M-1$ ($0<M\leq P$) tones, comprising the step of: repetitively concatenating upper M bits of the input digital signal until P bits are reached; comparing a concatenated signal obtained as a result of concatenation in the concatenating step with the input digital signal; and determining a value indicated by the upper M bits or a value obtained by subtracting 1 from the value indicated by the upper M bits as a normalized value depending on a comparison result in the comparing step.

It is another object of the present invention to provide a multi-dimensional interpolation method in a multi-dimensional interpolation apparatus which makes a multi-dimensional interpolation calculation for color space conversion by quantizing an input digital image signal, which has a P-bit input tone and is expressed by binary notation, to $2^M-1$ ($0<M\leq P$) tones, comprising the step of: repetitively concatenating upper M bits of the input digital image signal until P bits are reached; comparing a concatenated signal obtained as a result of concatenation in the concatenating step with the input digital image signal; and determining a value indicated by the upper M bits or a value obtained by subtracting 1 from the value indicated by the upper M bits as a quantized value depending on a comparison result in the comparing step.

It is still another object of the present invention to provide a method of normalizing a P-bit input digital signal, which is expressed by binary notation, to $2^M-1$ ($0<M\leq P$) tones, comprising the step of: repetitively concatenating upper M bits of the input digital signal L times (L is an integer) to exceed P bits; concatenating upper M×L−P bits of the input digital signal to an LSB of the input digital signal; comparing concatenated results in the two concatenating steps; and determining a value indicated by the upper M bits or a value obtained by subtracting 1 from the value indicated by the upper M bits as a normalized value depending on a comparison result in the comparing step.

It is yet another object of the present invention to provide a multi-dimensional interpolation method in a multi-dimensional interpolation apparatus which makes a multi-dimensional interpolation calculation for color space conversion by quantizing an input digital image signal, which has a P-bit input tone and is expressed by binary notation, to $2^M-1$ ($0<M\leq P$) tones, comprising the step of: repetitively concatenating upper M bits of the input digital image signal L times (L is an integer) to exceed P bits; concatenating upper M×L−P bits of the input digital image signal to an LSB of the input digital image signal; comparing concatenated results in the two concatenating steps; and determining a value indicated by the upper M bits or a value obtained by subtracting 1 from the value indicated by the upper M bits as a quantized value depending on a comparison result in the comparing step.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 15 shows section widths of prior art 1; and

DESCRIPTION OF THE EMBODIMENTS

Preferred embodiments of the present invention will now be described in detail in accordance with the accompanying drawings.

First Embodiment

<Arrangement of Color Copying Machine>

Figure 1:
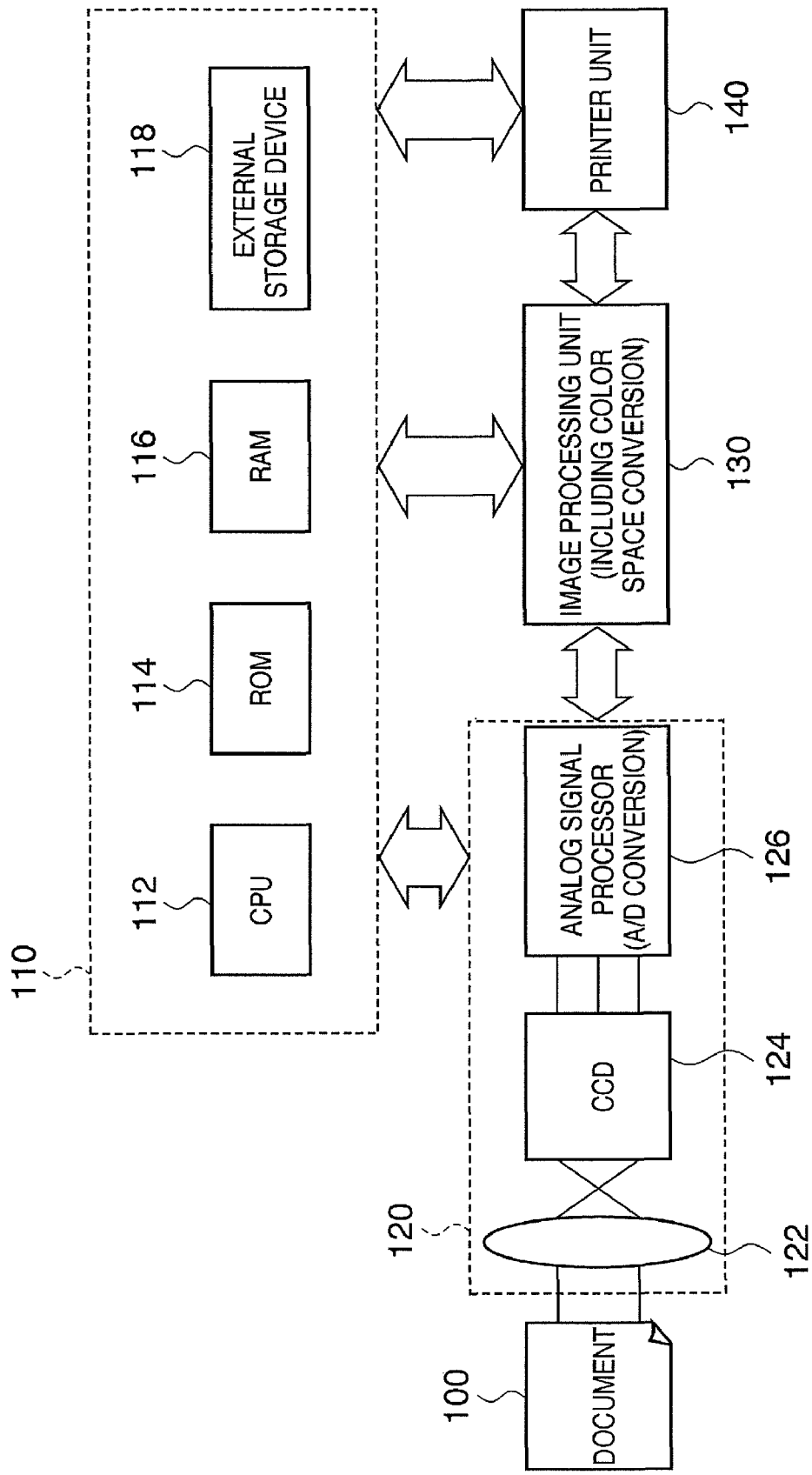
FIG. 1 is a block diagram showing an example of the overall arrangement of a color copying machine.

The present invention is not limited to a color copying machine. However, as an example, a case will be explained below wherein the present invention is applied to a color copying machine. FIG. 1 shows an example of the overall arrangement of a color copying machine which comprises a multi-dimensional interpolation apparatus according to an embodiment of the present invention. An image scanning unit 120 comprises a CCD sensor 124, an analog signal processor 126, and the like. An image of a document 100 which is formed on the CCD sensor 124 via a lens 122 is converted into R, G, and B analog electrical signals by the CCD sensor 124.

Converted image signals are input to the analog signal processor 126 to undergo correction and the like for respective colors R, G, and B, and are then analog-to-digital (A/D) converted. Digital full-color signals (to be referred to as digital image signals hereinafter) are input to an image processing unit 130.

The image processing unit 130 applies input γ (gamma) correction, color space conversion, density correction, and screen processing to the digital image signals, and outputs the processed digital image signals to a printer unit 140. The printer unit 140 comprises an exposure controller (not shown) comprising lasers and the like, an image forming unit (not shown), a transfer sheet convey controller (not shown), and the like, and records an image on a transfer sheet based on the input digital image signal.

A CPU circuit unit 110 comprises a CPU 112 for arithmetic control, a ROM 114 that stores permanent data and programs, a RAM 116 used to temporarily store data and to load programs, and the like. The CPU circuit unit 110 systematically controls the sequence of the color copying machine by controlling the image scanning unit 120, image processing unit 130, printer unit 140, and the like. An external storage device 118 is a medium such as a disk, which stores parameters and programs used by the color copying machine, and data, programs, and the like may be loaded from the external storage device 118 onto the RAM 116.

In the aforementioned color copying machine, the multi-dimensional interpolation apparatus according to the embodiment of the present invention is implemented as one function of the image processing unit 130, and executes color space conversion. Note that the multi-dimensional interpolation apparatus of the present invention converts the color space of an input device into that of an output device, but it can execute color space conversion of all types of input and output devices. The circuit arrangement and processing flow of the multi-dimensional interpolation apparatus will be described in detail below using FIG. 2.

<Circuit Arrangement and Overall Processing Flow of Multi-Dimensional Interpolation Apparatus>

Figure 2:
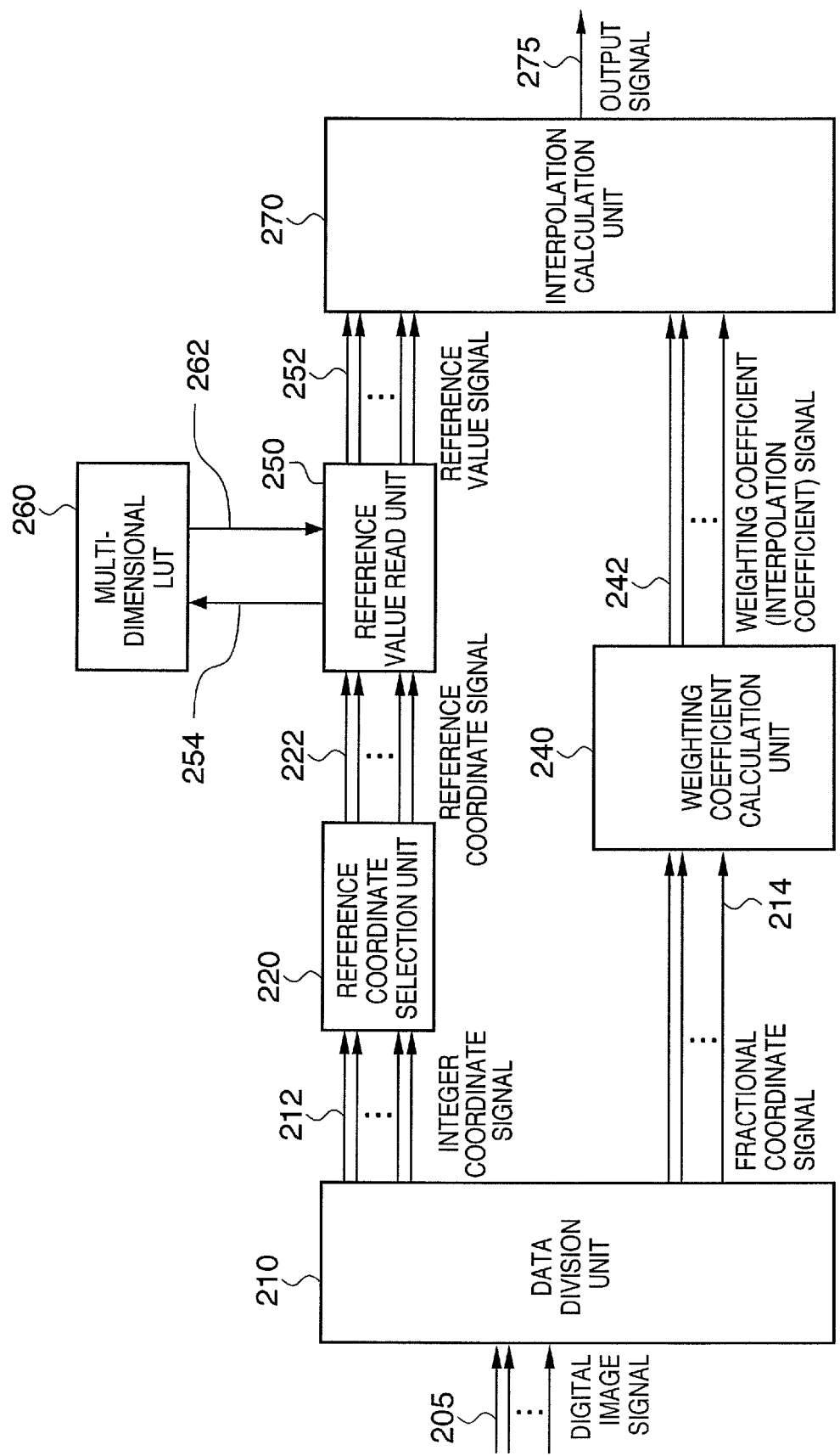
FIG. 2 is a block diagram showing the circuit arrangement of a multi-dimensional interpolation apparatus according to an embodiment of the present invention.

FIG. 2 is a block diagram for explaining the circuit arrangement and processing flow of the multi-dimensional interpolation apparatus according to this embodiment. The multi-dimensional interpolation apparatus according to this embodiment makes interpolation calculations for N-dimensional input digital image signals, and outputs a new signal as an interpolation value.

Digital image signals 205 are input to a multi-dimensional interpolation apparatus 200. The digital image signals 205 are N-dimensional signals. The digital image signals 205 are divided into integer coordinate signals 212 and fractional coordinate signals 214 by a data division unit 210. Since the digital image signals 205 are N-dimensional signals, both the integer coordinate signals 212 and fractional coordinate signals after data division include N signals.

In general, the bit depth of each integer coordinate signal 212 is determined according to the number of unit solids used in interpolation calculations. For example, if there are $2^M-1$ unit solids for an arbitrary axis of an N-dimensional space, the bit depth of the integer coordinate signal 212 corresponding to that axis is M bits.

Also, in general, each fractional coordinate signal 214 is expressed by a residual bit depth obtained by subtracting the bit depth of the corresponding integer coordinate signal 212 from that of the corresponding digital image signal 205. However, in this embodiment, the bit depth of the fractional coordinate signal 214 is extended to a predetermined internal calculation precision, as will be described later. For this reason, the bit depth of each fractional coordinate signal 214 output from the data division unit 210 becomes equal to W bits of the internal calculation precision.

A reference coordinate selection unit 220 determines coordinates required to read out reference value signals 252 required for interpolation calculations from a multi-dimensional LUT 260, and outputs them as reference coordinate signals 222. Likewise, a weighting coefficient calculation unit 240 calculates weighting coefficient (interpolation coefficient) signals 242 based on the fractional coordinate signals 214, and outputs them to an interpolation calculation unit 270.

Note that a method of calculating the weighting coefficients (interpolation coefficients) 242 from the fractional coordinate signals 214 will be described later.

A reference value read unit 250 reads out a required number of reference values from the multi-dimensional LUT 260 using the reference coordinate signals 222, and outputs them as reference value signals 252.

The multi-dimensional LUT 260 is implemented by a plurality of sub-memories. The reference value read unit 250 outputs address signals 254 as many as the number of sub-memories to the sub-memories to access them, and receives data signals 262 from the sub-memories. The interpolation calculation unit 270 receives a required number of reference value signals 252 and weighting coefficient (interpolation coefficient) signals 242, makes predetermined interpolation calculations (e.g., equations (1)), and outputs one output signal 275 (interpolated value).

Figure 3:
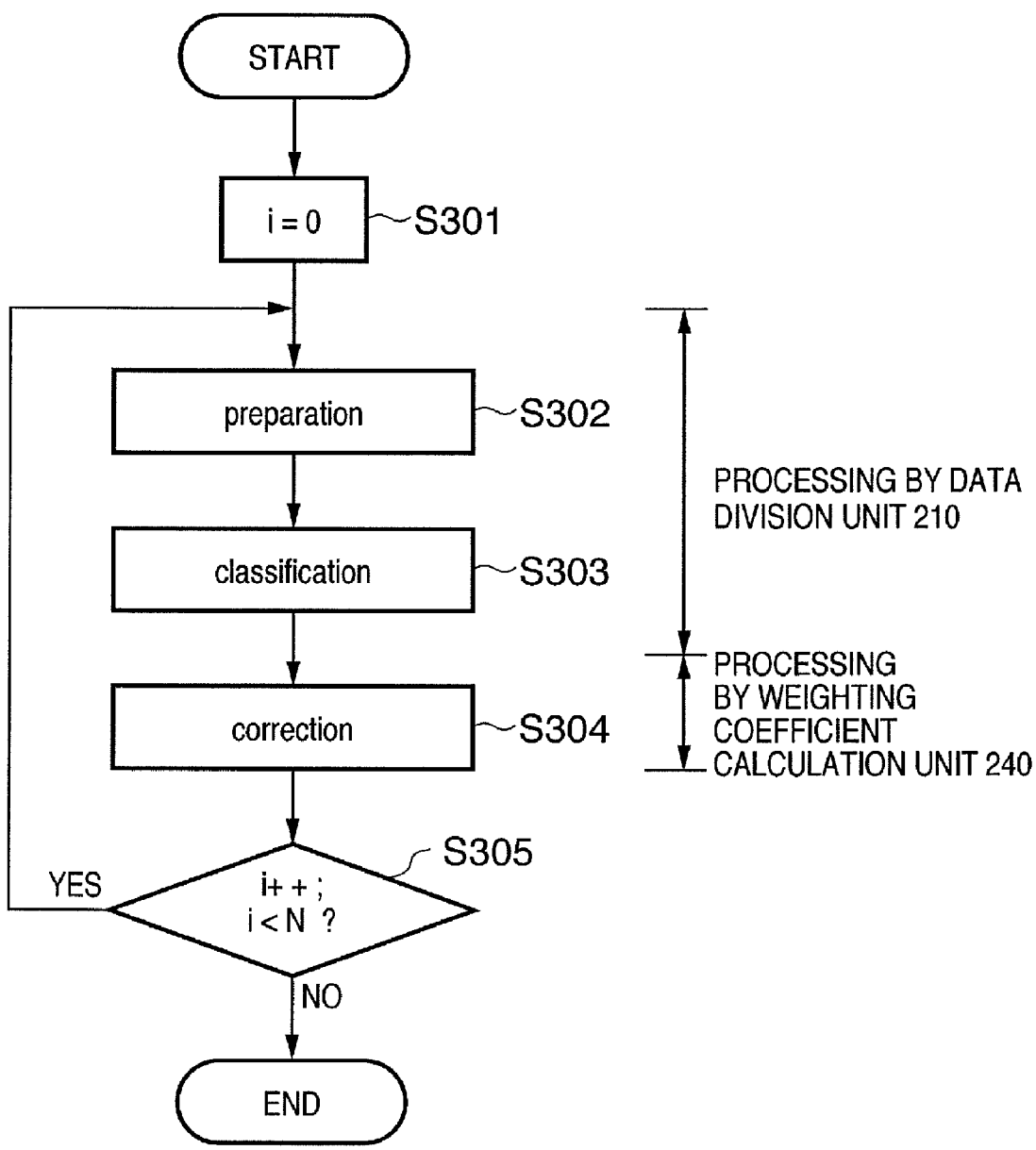
FIG. 3 is a flowchart showing processing of a data division unit and weighting coefficient calculation unit of the multi-dimensional interpolation apparatus according to the embodiment of the present invention.

FIG. 3 is a flowchart showing the processing flow of the data division unit 210 and weighting coefficient calculation unit 240 of the multi-dimensional interpolation apparatus according to this embodiment. A "preparation" process (step S302) and "classification" process (step S303) in FIG. 3 are processes for calculating integer coordinates intg_coord and fractional coordinates frac_coord of the color space required for interpolation calculations.

A "correction" process (step S304) in FIG. 3 is a process for calculating weighting coefficients (interpolation coefficients) g by normalizing the fractional coordinates frac_coord.

As is apparent from the flowchart of FIG. 3, a series of processes, i.e., the "preparation" process (step S302), "classification" process (step S303), and "correction" process (step S304) are executed in correspondence with the number of dimensions (N times) of the input digital image signals (steps S301 and S305).

Upon hardware implementation, by mounting hardware sets (N sets) as many as the series of processes, parallel processing can be easily attained, and the method of the present invention can be easily extended to the N-dimensional interpolation apparatus. The series of processes will be described in detail below.

Figure 4:
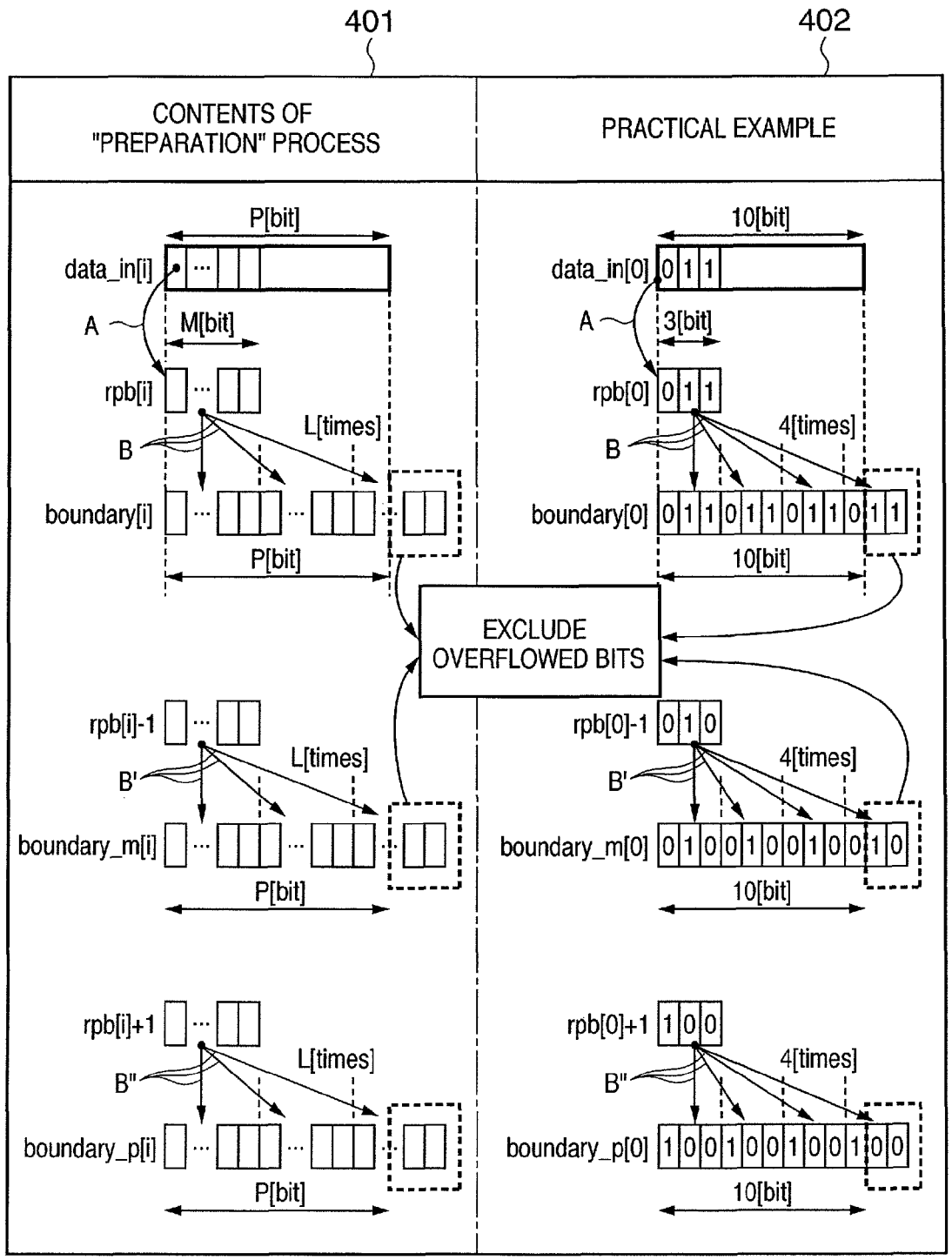
FIG. 4 is an explanatory view of "preparation" processing in the multi-dimensional interpolation apparatus according to the first embodiment of the present invention.

401 of FIG. 4 is an explanatory view showing the first detailed processing contents of the "preparation" process (step S302). In FIG. 4, '[i]' indicates an i-th signal of the N-dimensional input digital image signals.

Upper M bits of an input digital image signal data_in[i] having a P-bit input tone are extracted, and are defined as a repetition signal rpb[i] (process A in 401 of FIG. 4).

The repetition signal rpb[i] of M bits is repetitively concatenated L times (L is an integer) until P bits are reached. At this time, a signal formed by repeating the repetition signal rpb[i] L times has L×M bits. If this signal is larger than P bits, L×M−P bits are cut off. A signal generated in this manner is defined as a comparison signal boundary[i] (process B in 401 of FIG. 4).

Also, the same processing as in process B is applied to a signal obtained by subtracting only 1 from the repetition signal rpb[i], and a generated signal is defined as a comparison signal boundary_m[i] (process B' in 401 of FIG. 4).

Furthermore, the same processing as in process B is applied to a signal obtained by adding only 1 to the repetition signal rpb[i], and a generated signal is defined as a comparison signal boundary_p[i] (process B" in 401 of FIG. 4).

402 of FIG. 4 shows an example in which practical numerical values are substituted in the respective processes. When the number of reference values is $2^3$ (the third power of 2), upper 3 bits of the input digital image signal data_in[i] are extracted. In this case, the bit depth of the input digital image signal data_in[i] is 10 bits, and concatenation must be repeated four times to exceed this bit depth. Therefore, when the extracted upper 3 bits are '011', a signal obtained by concatenating these bits four times is '011 011 011 011'.

Of this concatenated signal, since lower 2 bits are superfluous, they are excluded, and the comparison signal boundary[i] is expressed by '011 011 011 0' Since a signal obtained by subtracting only 1 from the repetition signal rpb[i] is '010', the signal boundary_m[i] is expressed by '010 010 010 0'. Also, since a signal obtained by adding only 1 to the repetition signal rpb[i] is '100', the signal boundary_p[i] is expressed by '100 100 100 1'.

The first detailed processing contents of the "classification" process (step S303) will be described below using FIG. 5. Note that reference marks 'a' and 'b' of FIG. 6 are views for explaining an overview of the "classification" process (step S303).

Upon calculating an integer coordinate intg_coord[i] and fractional coordinate frac_coord[i] of the color space, the repetition signals rpb[i], rpb[i]−1, and rpb[i]+1 and the comparison signals boundary[i], boundary_m[i], and boundary_p[i], which are calculated in the "preparation" process (step S302), and the input digital image signal data_in[i] are used.

Figure 6:
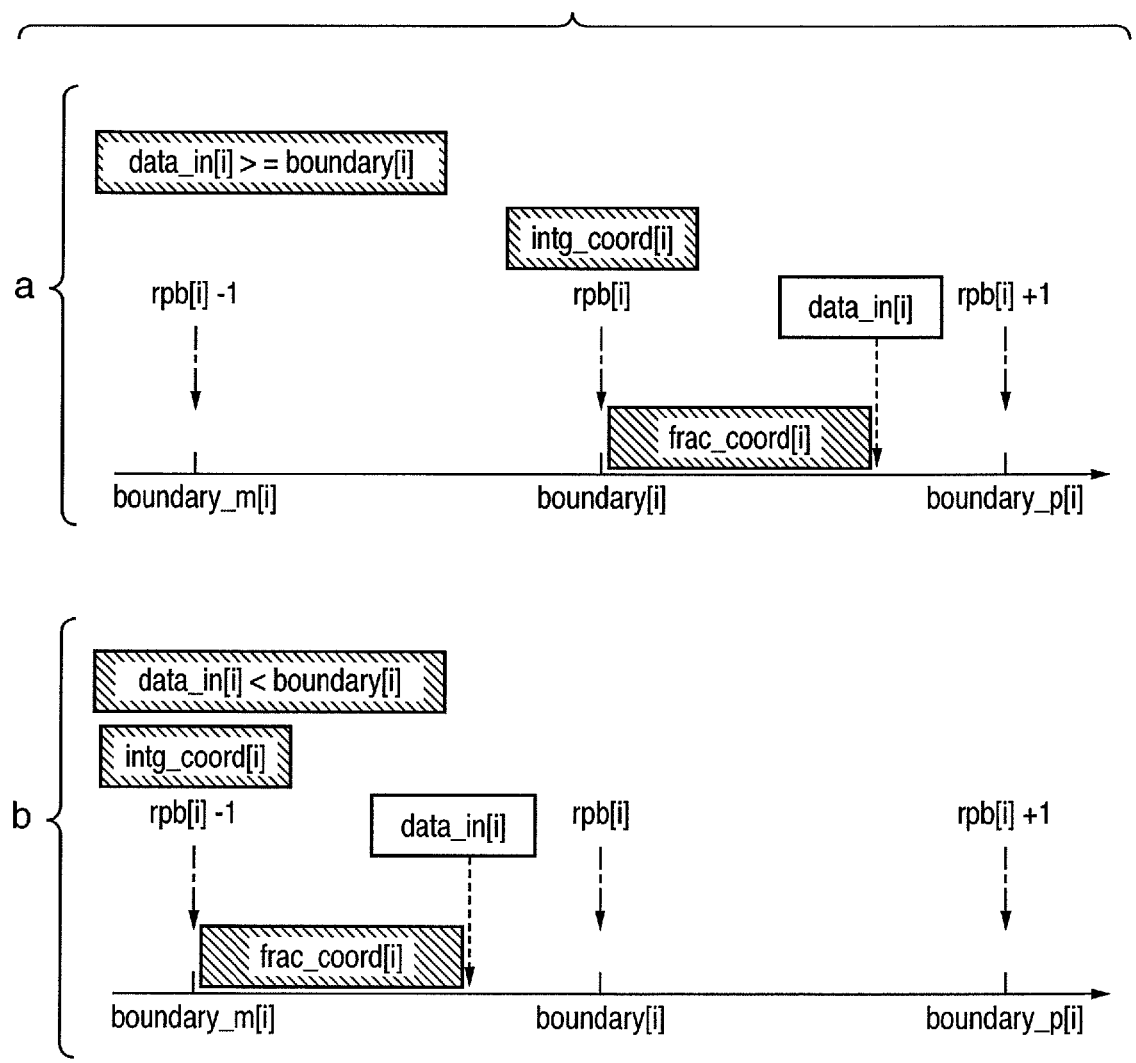
FIG. 6 is an explanatory view of the "classification" processing in the multi-dimensional interpolation apparatus according to the first embodiment of the present invention.
Figure 14:
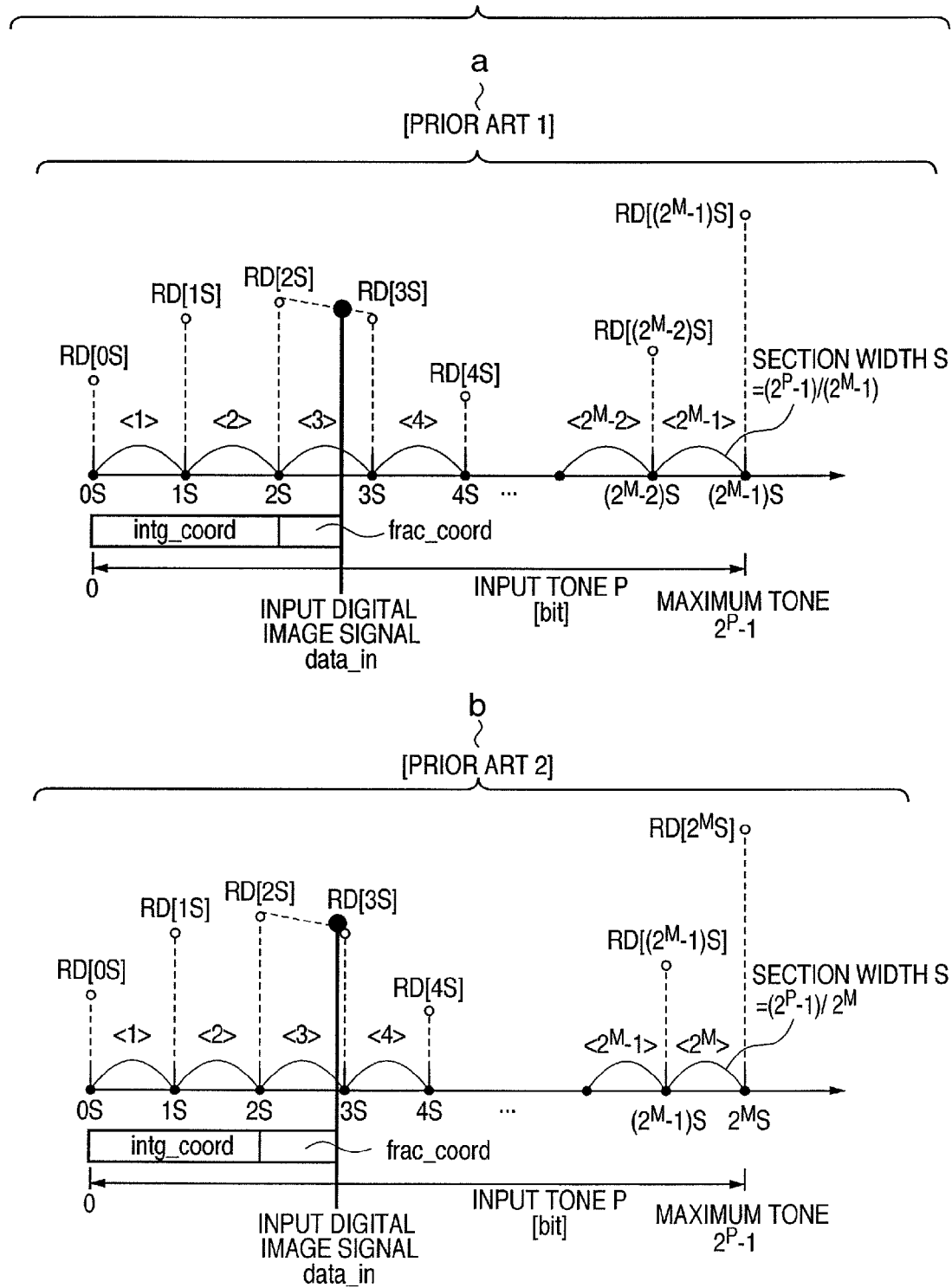
FIG. 14 is an explanatory view of multi-dimensional interpolation apparatuses of prior arts 1 and 2.

A left-to-right arrow in reference marks 'a' and 'b' of FIG. 6 indicates the magnitude of the input digital image signal data_in[i] as in reference marks 'a' and 'b' of FIG. 14, and the input digital image signal data_in[i] becomes larger as the arrow goes from the left to the right. Each of reference marks 'a' and 'b' of FIG. 6 shows three quantized values 'rpb[i]−1', 'rpb[i]', and 'rpb[i]+1', and there are two sections sandwiched between these quantized values.

Boundary values corresponding to these quantized values are the comparison signals boundary[i], boundary_m[i], and boundary_p[i]. If the input digital image signal data_in[i] is equal to or larger than boundary[i] (in case of step S501→"NO" in step S502), the flow advances to step S504. As a result, as shown in reference mark 'a' of FIG. 6, an integer coordinate intg_coord[i] of the color space assumes rpb[i].

Then, a value obtained by subtracting the comparison signal boundary[i] from the input digital image signal data_in[i] becomes a fractional coordinate frac_coord[i] of the color space. A value obtained by subtracting the comparison signal boundary[i] from the comparison signal boundary_p[i] becomes a section width section[i].

Conversely, if the input digital image signal data_in[i] is smaller than boundary[i] (in case of step S501→"YES" in step S502), the flow advances to step S503. As a result, as shown in reference mark 'b' of FIG. 6, an integer coordinate intg_coord[i] of the color space assumes a value of 'rpb[i]−1'.

Then, a fractional coordinate frac_coord[i] of the color space assumes a value obtained by subtracting boundary_m[i] from the input digital image signal data_in[i]. Also, a value obtained by subtracting the comparison signal boundary_m[i] from the comparison signal boundary[i] becomes a section width section[i].

As described above, according to the multi-dimensional interpolation apparatus that adopts the processing of this embodiment, upon calculating the integer coordinates intg_coord and fractional coordinate frac_coord of the color space, neither a divider nor a remainder calculator need be used.

Even when the maximum tone $2^P-1$ is indivisible by the number $2^M-1$ of sections (when sections having section widths S different from other sections are formed like hatched sections in FIG. 15), no processing for pre-storing the boundary values and section widths of respective sections, comparing the input digital image signal data_in[i] with all boundary values, and calculating an integer coordinate intg_coord[i] of the color space based on their comparison result of prior art 1 is required in this multi-dimensional interpolation apparatus.

Finally, the fractional coordinate frac_coord[i] is divided by the section width section[i] in the "correction" process (step S304) by the weighting coefficient calculation unit 240, and the quotient is defined as a weighting coefficient (interpolation coefficient) g.

Figure 5:
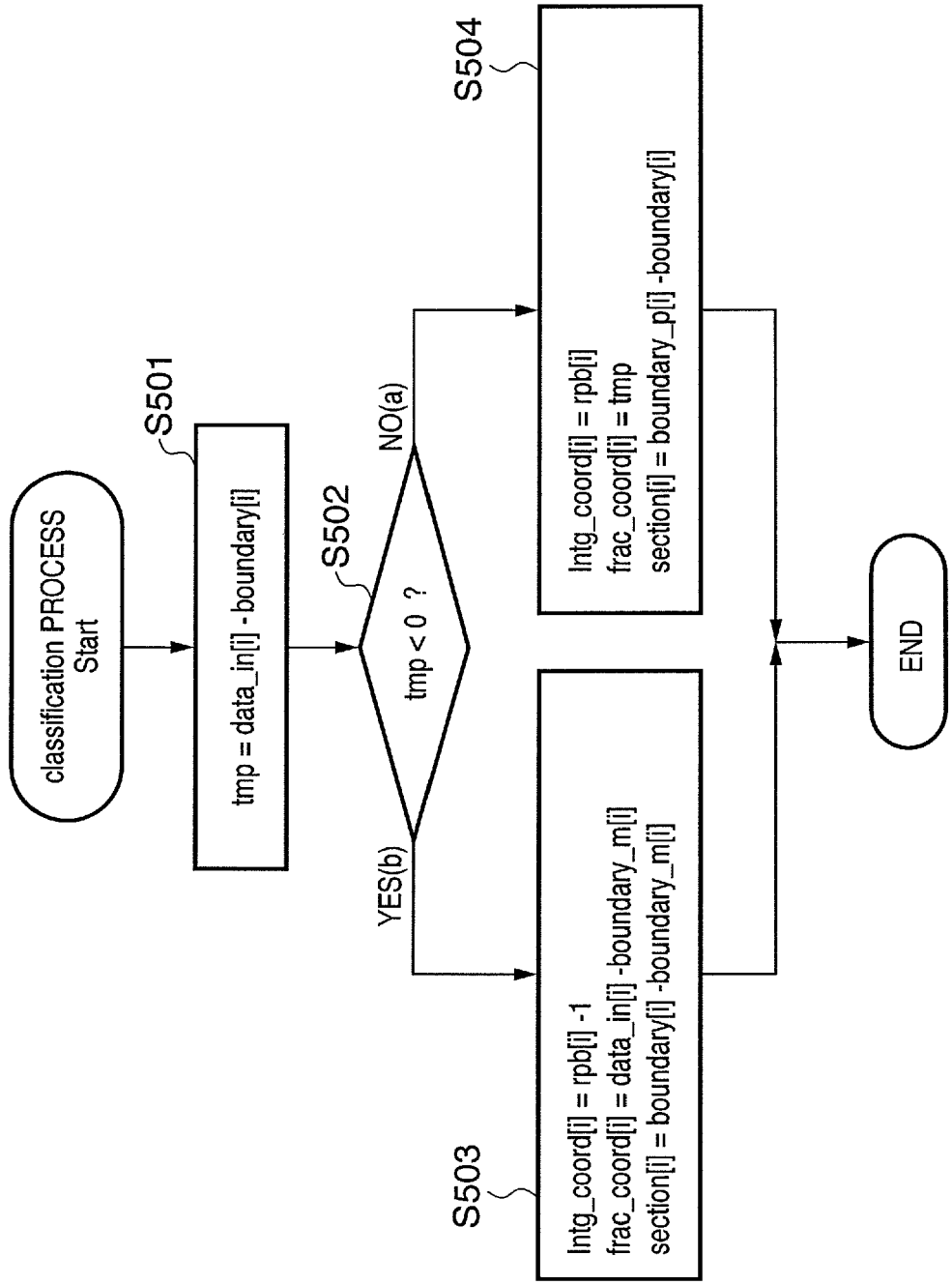
FIG. 5 is a flowchart showing "classification" processing in the multi-dimensional interpolation apparatus according to the first embodiment of the present invention.

In the processing shown in FIG. 5, conditions having two different section widths (boundary_p[i]−boundary[i] and boundary[i]−boundary_m[i]) exist. Therefore, upon calculating the weighting coefficient (interpolation coefficient) g, the fractional coordinate frac_coord[i] must be divided by the section width section[i] in the "correction" process (step S304). That is, in order to cope with an arbitrary P-bit input tone and arbitrary M, the weighting coefficient calculation unit 240 must include a divider.

However, when the maximum tone $2^P-1$ is divisible by the number $2^M-1$ of sections, the section widths section[i] have the same value independently of sections. Therefore, the need for the divider can be obviated using an approximate expression. Hence, a scheme using an approximate expression will be explained below.

Figure 7:
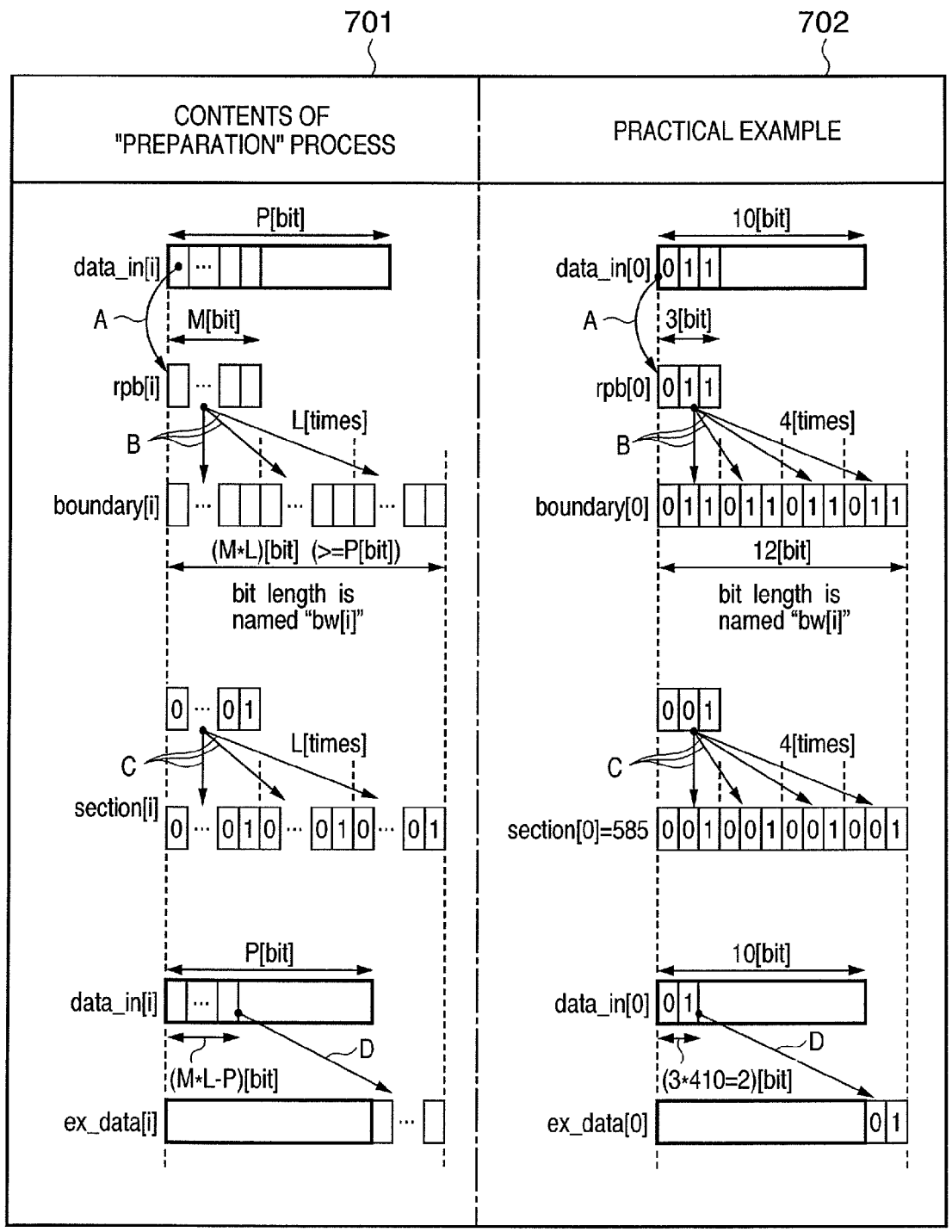
FIG. 7 is an explanatory view of the "preparation" processing in the multi-dimensional interpolation apparatus according to the first embodiment of the present invention.

701 of FIG. 7 shows the second detailed processing contents of the "preparation" process (step S302). Upper M bits of an input digital image signal data_in[i] having a P-bit input tone are extracted, and are defined as a repetition signal rpb[i] (process A in 701 of FIG. 7).

The repetition signal rpb[i] of M bits are repetitively concatenated L times (L is an integer) until the concatenated result becomes equal to or larger than P bits. At this time, a signal formed by repeating the repetition signal rpb[i] L times has L×M bits (let bw[i] be this bit depth).

A signal generated in this manner is defined as a comparison signal boundary[i] (process B in 701 of FIG. 7). Unlike in the processing of FIG. 4, even when the signal of L×M bits generated by repetitively concatenating the repetition signal rpb[i] L times is larger than P bits, L×M−P bits are not cut off.

Next, an M-bit signal representing "1" (an M-bit signal in which only the LSB is "1") is repetitively concatenated by the same number of times (L times) as in process B in 701 of FIG. 7, thus generating a section width signal section[i] of L×M bits (process C in 701 of FIG. 7).

Finally, the input digital image signal data_in[i] is extended by L×M−P bits to have the same bit depth as that of the comparison signal boundary[i].

Upper L×M−P bits of the input digital image signal data_in [i] are extracted, and are concatenated to the LSB of the input digital image signal data_in[i], thus generating a signal ex_data[i] (process D in 701 of FIG. 7).

702 of FIG. 7 shows an example in which practical numerical values are substituted in the respective processes. When the number of reference values is $2^3$ (the third power of 2), upper 3 bits of the input digital image signal data_in[i] are extracted. In this case, concatenation must be repeated four times to exceed the bit depth of 10 bits of the input digital image signal data_in[i]. That is, when the extracted upper 3 bits are '011', a signal obtained by concatenating these bits four times is '011 011 011 011', and is used as the comparison signal boundary[i].

A 3-bit value '001' indicating '1' is similarly repetitively concatenated four times to yield '001 001 001 001', which is used as the section width signal section [i].

The bit depth of the input digital image signal data_in[i] is smaller by 2 bits than that of the comparison signal boundary [i]. To compensate for these bits, a value '01' of the upper 2 bits of the input digital image signal data_in[i] is concatenated to its LSB side to generate a 12-bit, extended input digital image signal ex_data[i].

Figure 8:
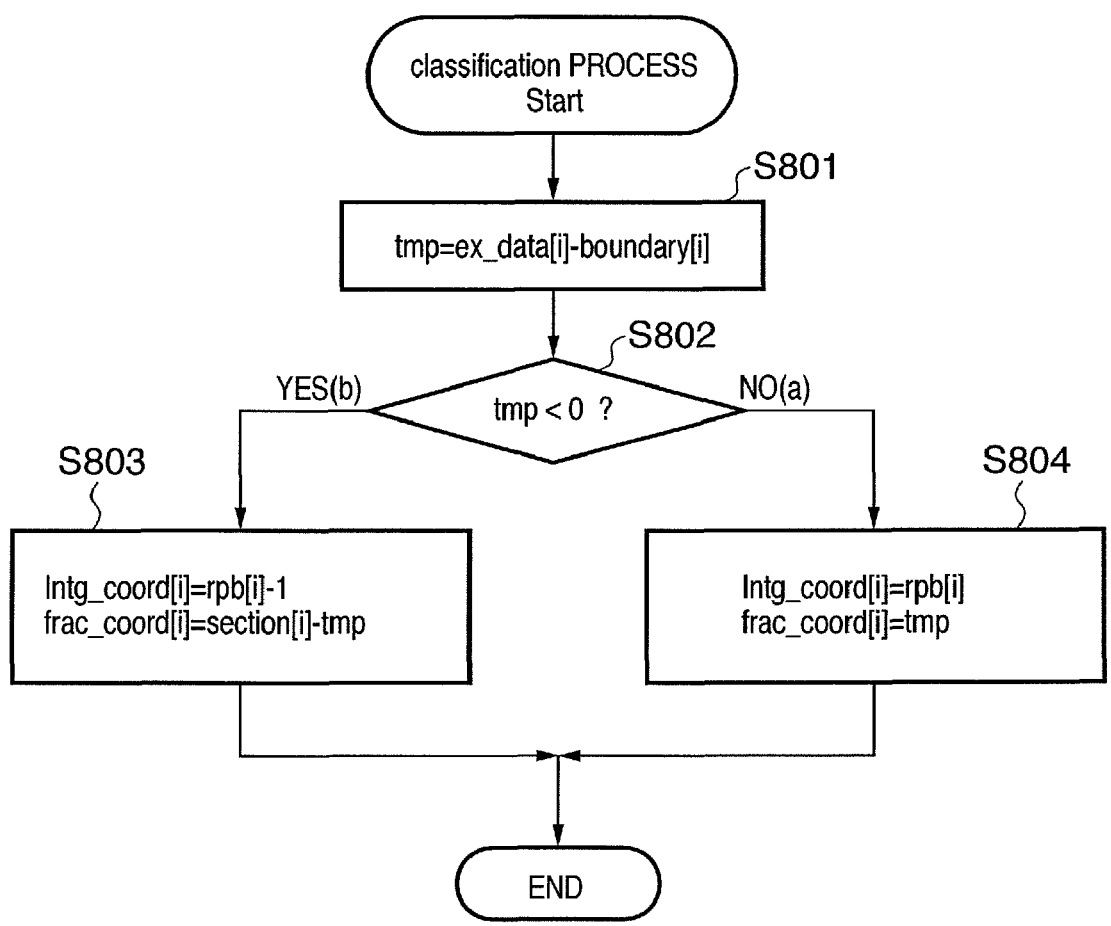
FIG. 8 is a flowchart showing "classification" processing in the multi-dimensional interpolation apparatus according to the second embodiment of the present invention.
Figure 9:
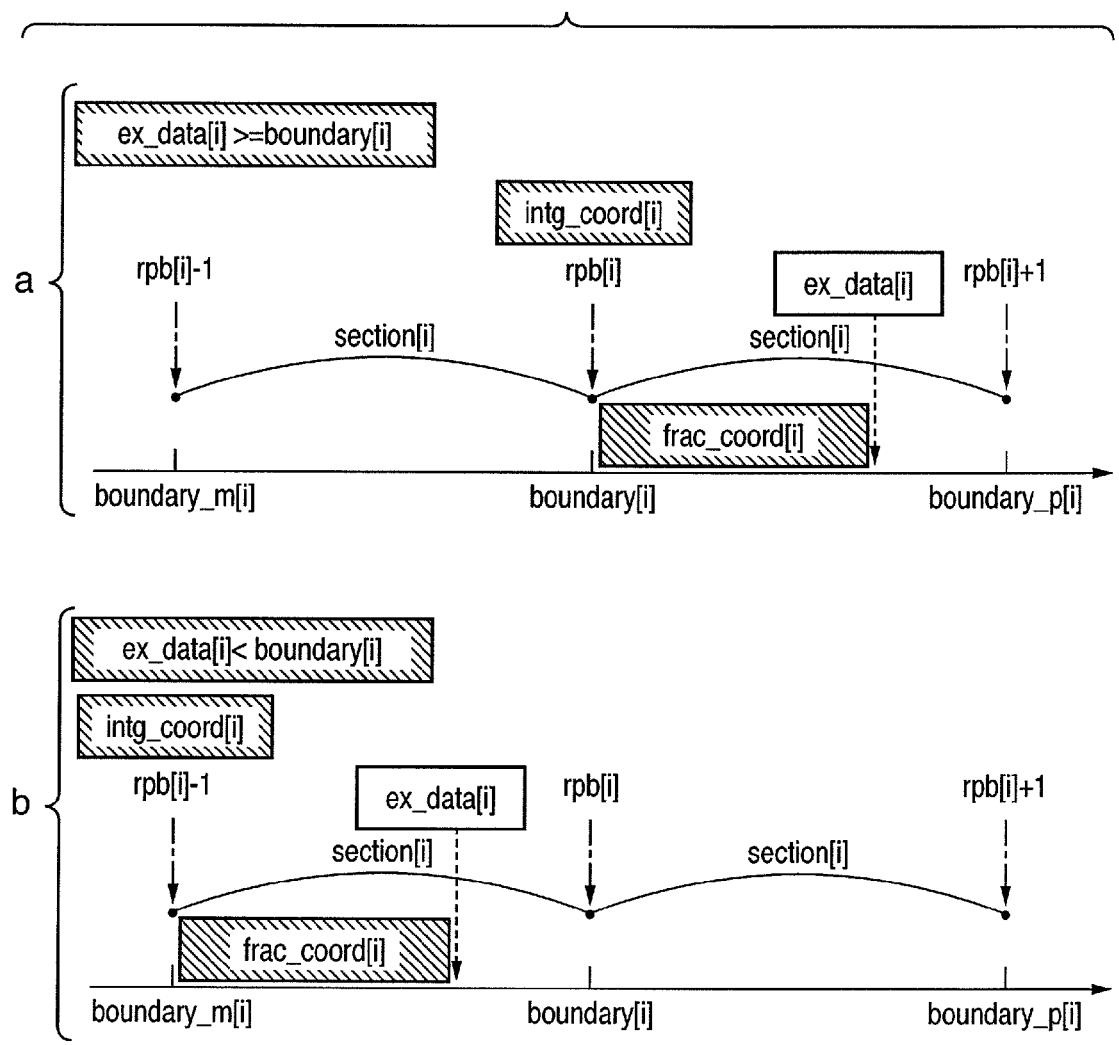
FIG. 9 is an explanatory view of the "classification" processing in the multi-dimensional interpolation apparatus according to the second embodiment of the present invention.

The second detailed processing contents of the "classification" process (step S303) will be described below using FIG. 8. Note that reference marks 'a' and 'b' of FIG. 9 are views for explaining the processing of the "classification" process (step S303). Upon calculating an integer coordinate intg_coord[i] and fractional coordinate frac_coord[i] of the color space, the repetition signal rpb[i] and the comparison signal boundary [i], the section width signal section[i], and the extended input digital image signal ex_data[i], which are calculated in the "preparation" process (step S302), are used.

Each of reference marks 'a' and 'b' of FIG. 9 shows three quantized values 'rpb[i]−1', 'rpb[i]', and 'rpb[i]+1', and there are two sections sandwiched between these quantized values. Boundary values corresponding to these quantized values are the comparison signals boundary[i], boundary_m [i], and boundary_p[i] as in reference marks 'a' and 'b' of FIG. 6.

If the extended input digital image signal ex_data[i] is equal to or larger than boundary[i] (in case of step S801→"NO" in step S802), the flow advances to step S804. As a result, as shown in reference mark 'a' of FIG. 9, an integer coordinate intg_coord[i] of the color space assumes rpb[i]. A value ('tmp' in FIG. 8) obtained by subtracting the comparison signal boundary[i] from the extended input digital image signal ex_data[i] is used as a fractional coordinate frac_coord[i] of the color space.

Conversely, if the extended input digital image signal ex_data [i] is smaller than boundary[i] (in case of step S801→"YES" in step S802), the flow advances to step S803. As a result, as shown in reference mark 'b' of FIG. 9, an integer coordinate intg_coord[i] of the color space assumes a value of 'rpb[i]−1'. At this time, a fractional coordinate frac_coord[i] of the color space can be calculated by subtracting the absolute value of the value ('tmp' in FIG. 8) obtained by subtracting boundary[i] from the extended input digital image signal ex_data[i] from the section width section[i].

At this time, since the comparison signal boundary[i] is an integer multiple of M bits, a maximum tone $2^{M \times L}-1$ is always divisible by the number $2^M-1$ of sections, and the section width section[i] assumes the same value independently of sections, i.e., a fixed value determined by the value M. Therefore, the need for calculating the boundary values (boundary_m[i] and boundary_p[i]) of 'rpb[i]−1' and 'rpb[i]+1' can be obviated unlike in the processing shown in FIG. 4.

As can be seen from the above description, according to the multi-dimensional interpolation apparatus that adopts the processing of this embodiment, upon calculating the integer coordinates intg_coord and fractional coordinate frac_coord of the color space, neither a divider nor a remainder calculator need be used. The maximum tone $2^{M \times L}-1$ is always divisible by the number $2^M-1$ of sections, and sections having section widths S different from other sections like hatched sections in FIG. 15 are never generated.

In this processing as well, the fractional coordinate frac_coord[i] is divided by the section width section[i] in the "correction" process (step S304), and a weighting coefficient (interpolation coefficient) g can be calculated based on the quotient. However, since the section width section[i] is a fixed value, the division can be approximated.

The "correction" process (step S304) in case of approximation will be described below.

Figure 10:
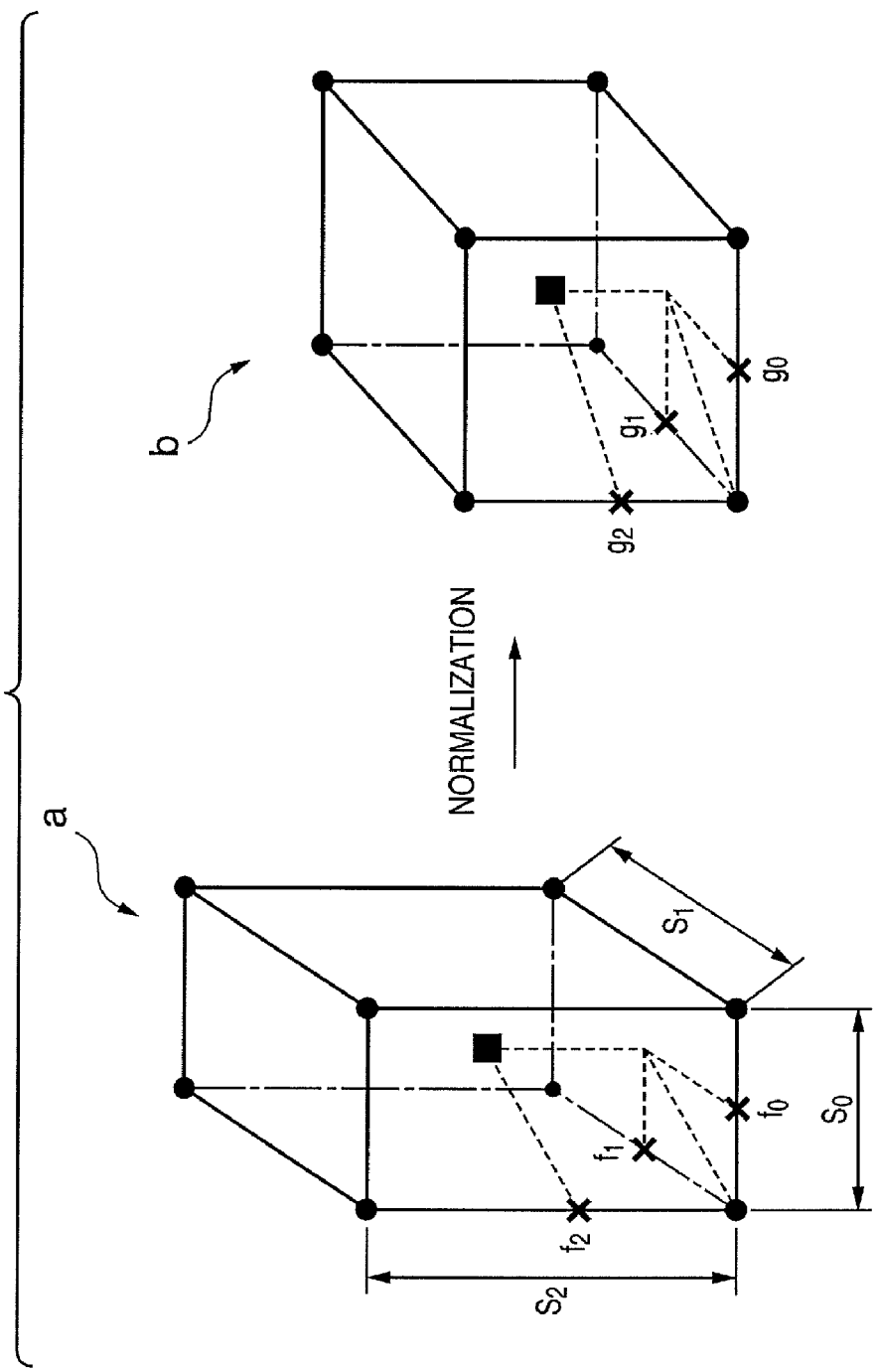
FIG. 10 is an explanatory views showing normalization when the numbers of reference points of respective axes are different.

A rectangular parallelepiped in the three-dimensional interpolation calculations is shown in reference mark 'a' of FIG. 10. When the input digital image signals R, G, and B respectively have $2^{MR}$, $2^{MG}$, and $2^{MB}$ points of reference values on their axes, the total number of reference values is $2^{(MR+MG+MB)}$.

Figure 13:
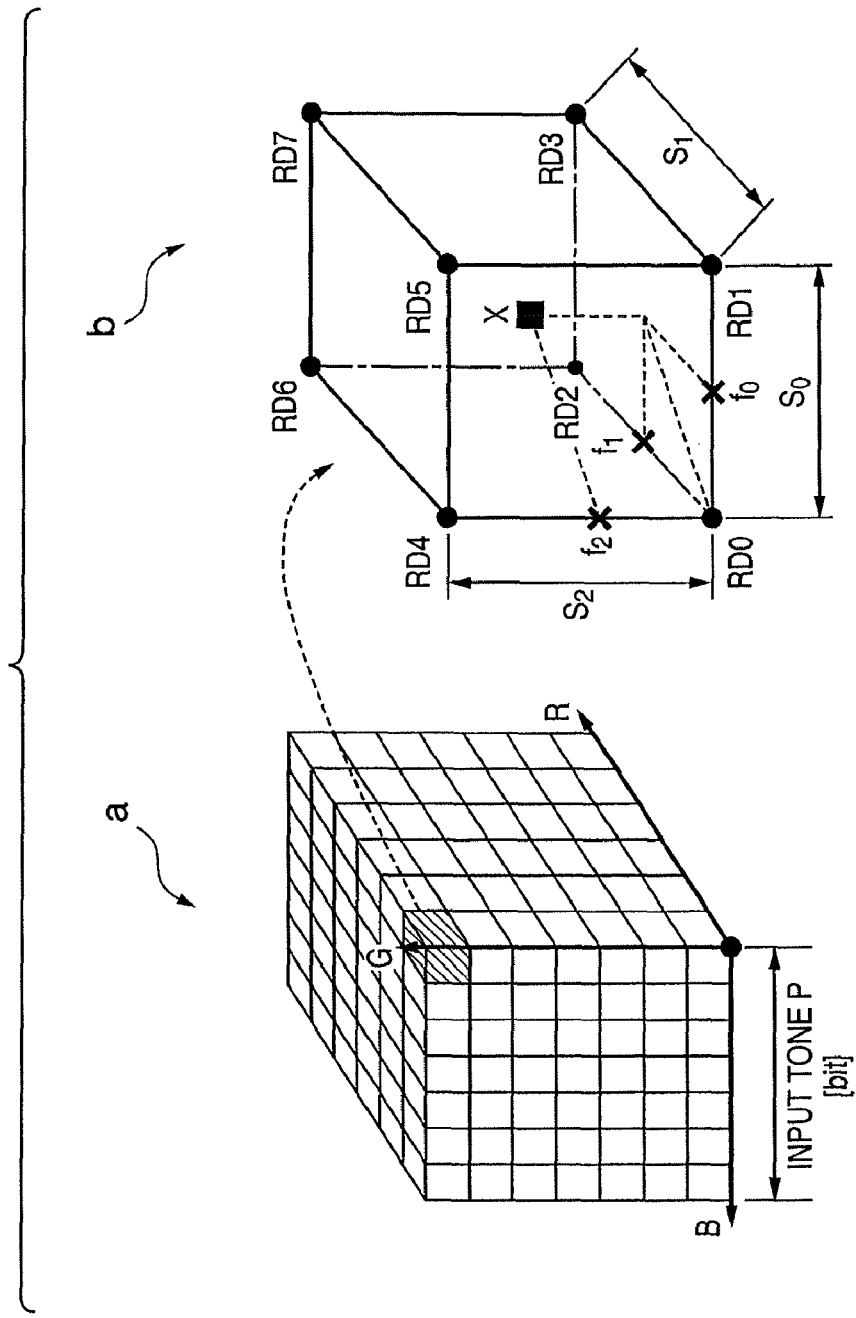
FIG. 13 is a view showing unit solids obtained by dividing the color space of a three-dimensional input (RGB space) by a limited value in respective axis directions, and a view showing a selected unit solid.

At this time, the unit solid shown in reference mark 'a' of FIG. 13 becomes a cube when MR=MG=MB holds, but it becomes a rectangular parallelepiped when MR=MG=MB does not hold. In the following description, identifications of R, G, and B are expressed by i. In order to correctly make interpolation calculations, the fractional coordinate frac_coord[i] must be divided by the section width section[i] to normalize the fractional coordinate frac_coord[i] of each axis to a value g[i], as shown in reference mark 'b' of FIG. 10.

Since the maximum tone is $2^{bw[i]}-1$ based on a bit depth bw[i] of the comparison signal calculated in the "preparation" process (step S302), the section width section[i] becomes $(2^{bw[i]}-1)/(2^{Mi}-1)$. As described by the following equations, $(2^{bw[i]}-1)/(2^{Mi}-1)$ is substituted in an equation of g[i] and is expanded. When FTMP which can be calculated by the bit shift operations and subtraction is described by the following equation, g[i] is calculated as follows.

$$bw[i] = Mi \times Li$$

$$\text{section}[i] = \frac{2^{bw[i]} - 1}{2^{Mi} - 1}$$

$$FTMP[i] = (\text{frac\_coord}[i] << Mi) - \text{frac\_coord}[i]$$

-continued $$g[i] = \frac{\text{frac\_coord}[i]}{\text{section}[i]}$$

$$= \text{frac\_coord}[i] \times \frac{(1 << Mi) - 1}{(1 << bw[i]) - 1}$$

$$= \frac{FTMP[i]}{(1 << bw[i]) - 1}$$

where "frac_coord[i]<<Mi" indicates the left bit shift operation of frac_coord[i] by Mi bits.

Since the bit depths bw[i] of the comparison signals are different for respective axes, normalization cannot be done unless they are unified. Hence, a numerical value W which is equal to or larger than largest bw[i] is defined as a bit depth for normalization, and the weighting coefficients (interpolation coefficients) g of respective axes are converted into the W-bit precision. As a result, the internal calculation precision of the interpolation calculations is specified by W bits.

If bw[i] is sufficiently large, approximation can be realized, as described by the following equation, and normalization calculations can be implemented by only the bit shift operations, additions, and subtractions.

$$g[i] = \frac{FTMP[i]}{(1 << bw[i]) - 1}$$

$$= \frac{FTMP[i]}{1 << W} \times \frac{1 << W}{(1 << bw[i]) - 1}$$

$$= \frac{FTMP[i]}{1 << W} \times \frac{(1 << W) + 1}{(1 << bw[i]) - 1 + 1}$$

$$= \left[ FTMP[i] \times \left\{ \frac{1 << W}{1 << bw[i]} + \frac{1}{1 << bw[i]} \right\} \right] >> W$$

$$= [FTMP[i] << (W - bw[i]) + FTMP[i] >> bw[i]] >> W$$

$$(W \geq bw[i])$$

Figure 12:
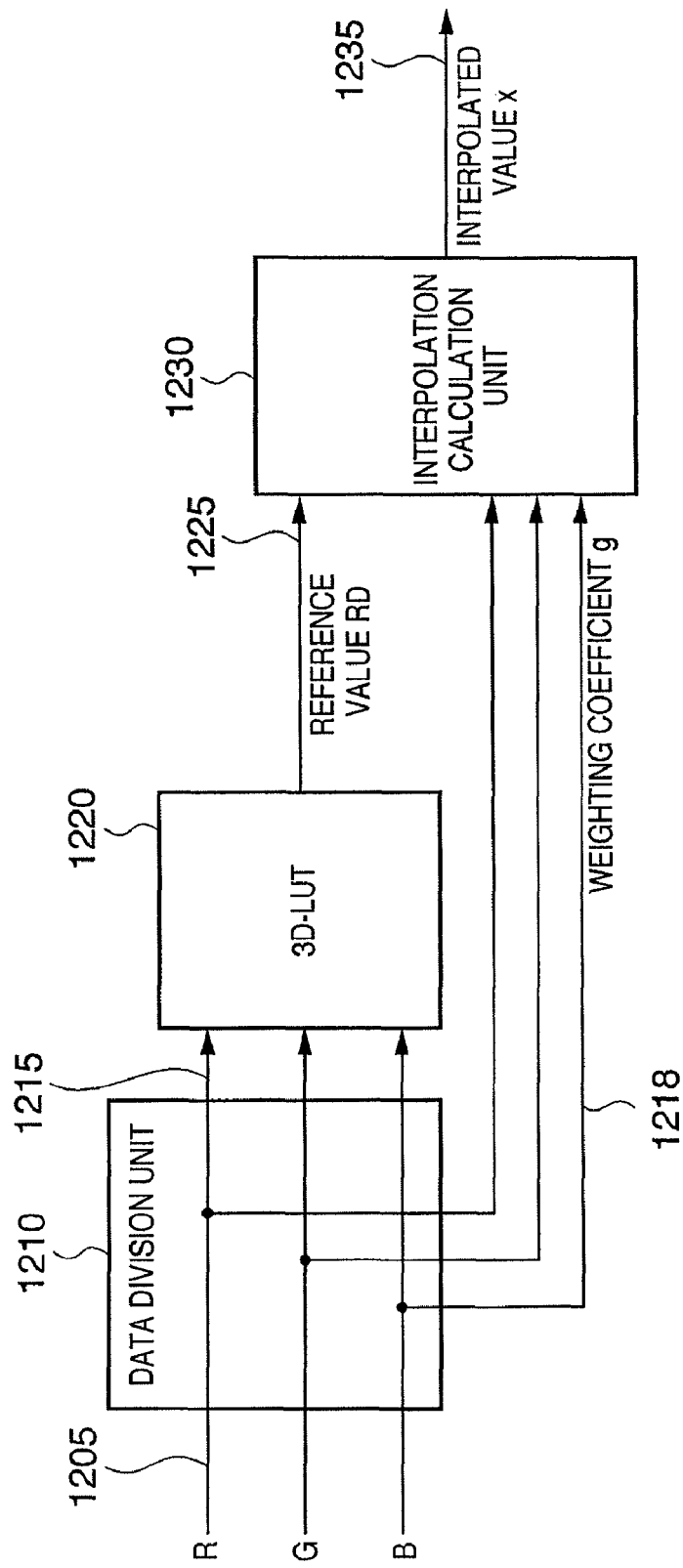
FIG. 12 is a block diagram showing functional blocks used to make three-dimensional interpolation calculations using a 3D-LUT.

Note that the right shift operation processing by W bits described in the above equation is done at the end of the interpolation calculations (e.g., equations (1)) in the interpolation calculation unit 1230 in FIG. 12, so as to guarantee the calculation precision. For this reason, the calculation contents of the "correction" process (step S304) of this embodiment are described by:

$$g[i] = FTMP[i] << (W - bw[i]) + FTMP[i] >> bw[i]$$
$$(W \geq bw[i])$$

Figure 11:
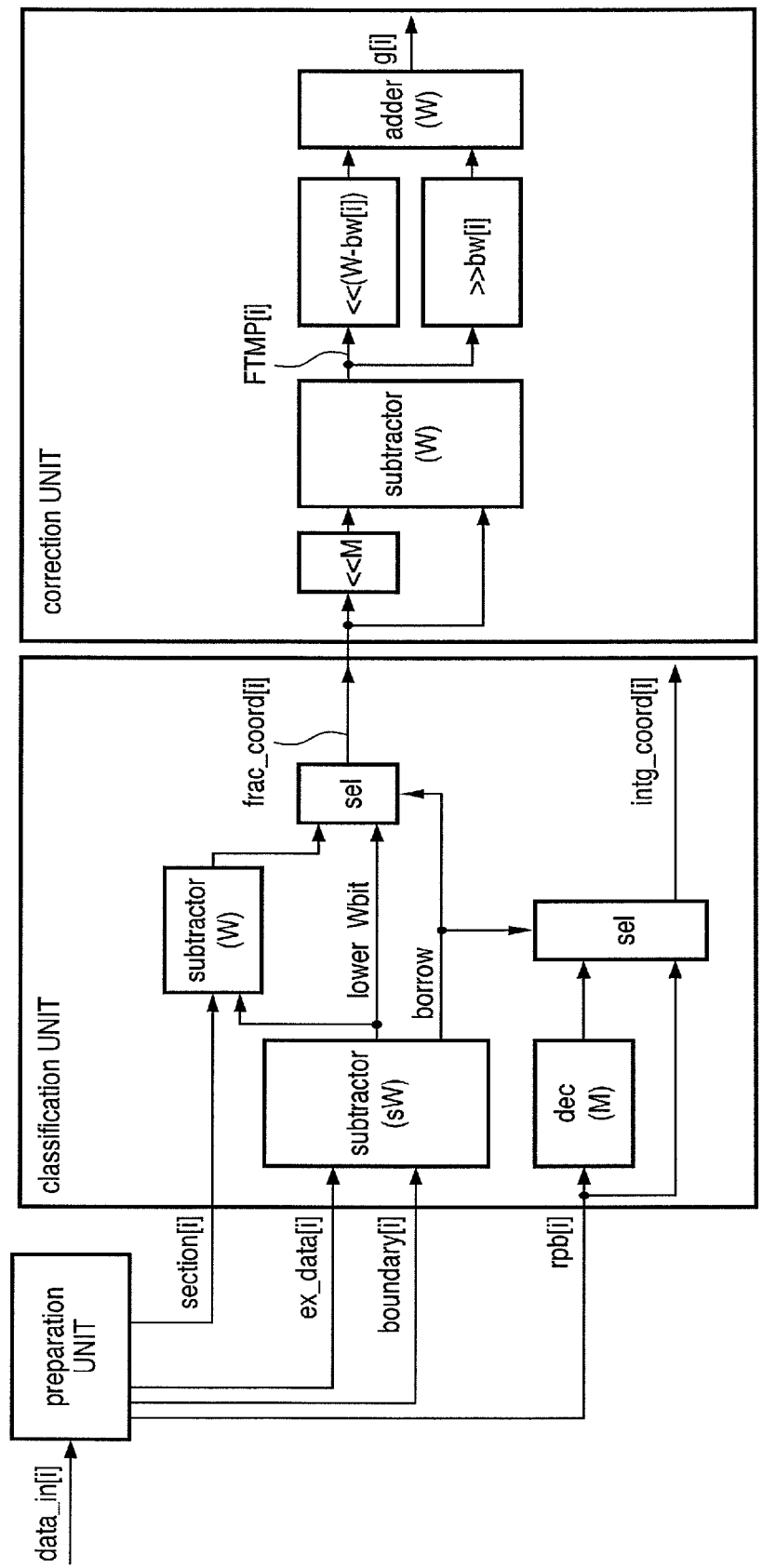
FIG. 11 is a block diagram showing a circuit example of a data division unit and weighting coefficient calculation unit of the multi-dimensional interpolation apparatus according to the second embodiment of the present invention.

FIG. 11 shows a circuit example upon hardware implementation of the data division unit 210 and weighting coefficient calculation unit 240 of this embodiment.

In this embodiment, the multi-dimensional interpolation calculations can be made for an arbitrary P-bit input tone and arbitrary M by the approximation without using any divider.

As described above, according to this embodiment, the total number of reference values RD becomes $(2^M)^N$ in the N-dimensional interpolation calculations, and hardware implementation of the LUT can be efficiently done using a memory. The integer coordinate intg_coord and fractional coordinate frac_coord of the color space can be calculated by the simple bit shift operations, additions, and subtractions without using any divider or remainder calculator.

Also, an arbitrary P-bit input tone and arbitrary M can be extended to N dimensions. In this way, according to this embodiment, a multi-dimensional interpolation apparatus which can assure a small circuit scale even for storage means that forms the LUT and calculation means for interpolation calculations can be provided.

The multi-dimensional interpolation apparatus according to this embodiment pre-stores all boundary values for an arbitrary P-bit input tone and arbitrary M in storage means such as a register or the like. For this reason, the integer coordinate intg_coord can be calculated without comparing the input digital image signal with all the boundary values. Furthermore, since the input digital image signal is extended to the bit depth corresponding to a multiple of M, the integer coordinate intg_coord can be calculated by invariably quantizing the input digital image signal to even $2^M-1$ sections.

Other Embodiments

Figure 16:
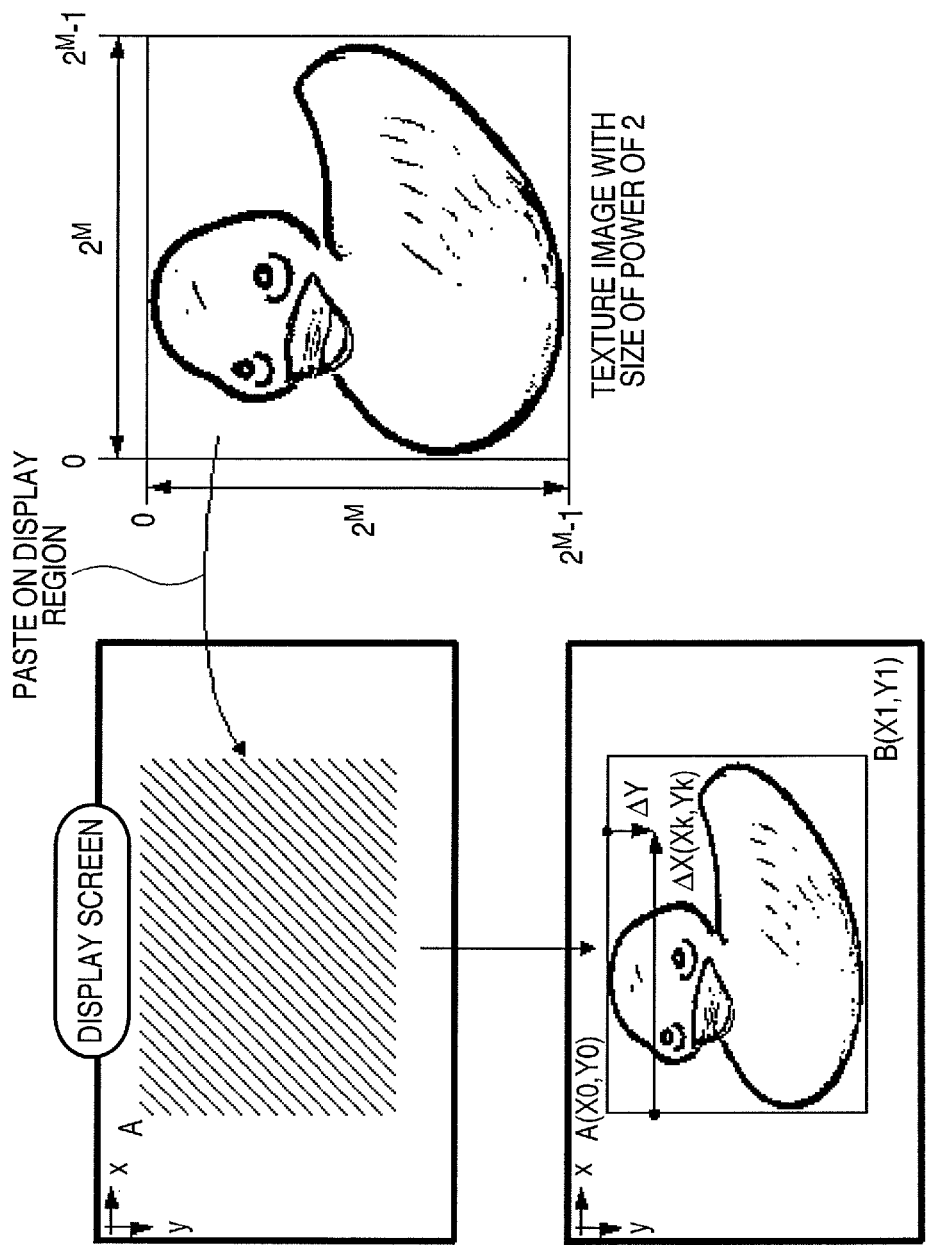
FIG. 16 is an explanatory view of texture mapping according to another embodiment.

Note that the present invention can be applied to a case wherein a texture image having a size of the power of 2 is to be displayed on a rectangular region A-B (hatched region) on the display screen of a display. This embodiment will be described below using FIG. 16. Normally, in a graphic system, a renderer LSI (rendering hardware) receives the coordinates of points A and B as vertices of the rectangular region A-B (hatched region) from a CPU, and generates pixels which form the rectangular region A-B by rasterization. Next, a texture image corresponding to the generated pixels is referred to from a memory to determine color values to be displayed on the display screen of the display, thus rendering it on the display screen.

Using the present invention, color values to be referred to can be easily read out from the texture image on the memory. Ratios Δx and Δy to $2^{P-1}$ are calculated first by:

$$\Delta x = (Xk - X0)/(X1 - X0) * (2^{P-1})$$

$$\Delta y = (Yk - Y0)/(Y1 - Y0) * (2^{P-1})$$

and Δx and Δy are expressed by P-bit values.

As shown in FIG. 4, upper M bits of this digital signal Δx (Δy) are extracted, and the extracted M bits are repetitively concatenated until P bits are reached, thus generating a P-bit comparison signal. Then, as shown in FIG. 5, the digital signal Δx (Δy) is compared with the comparison signal. When the digital signal Δx (Δy) is equal to or larger than the comparison signal, a value indicated by the extracted M bits is used as a normalized value. When the digital signal Δx (Δy) is smaller than the comparison signal, a value obtained by subtracting 1 from the value indicated by the extracted M bits is used as a normalized value.

Alternatively, as shown in FIG. 7, upper M bits of this digital signal Δx (Δy) are extracted, and the extracted M bits are repetitively concatenated L times (L is an integer) to exceed P bits, thus generating a comparison signal of M×L bits. Also, upper M×L−P bits of the digital signal Δx (Δy) are extracted and are concatenated to the LSB side of the digital signal Δx (Δy), thus extending the digital signal Δx (Δy) to M×L bits. Then, as shown in FIG. 8, the extended digital signal Δx (Δy) is compared with the comparison signal. When the extended digital signal Δx (Δy) is equal to or larger than the comparison signal, a value indicated by the extracted M bits is used as a normalized value. When the extended digital signal Δx (Δy) is smaller than the comparison signal, a value obtained by subtracting 1 from the value indicated by the extracted M bits is used as a normalized value.

The normalized values calculated in the above process represent texture coordinates which indicate color values (texture pixel values) to be referred to from the texture image, and the texture image in the memory need only be read out according to the normalized values and be rendered on the display screen of the display.

As described above, the normalization method of the present invention can be used not only in color space conversion but also for the purpose of calculating normalized texture coordinates used to refer to a texture image having a size of the power of 2 on the memory. That is, according to the present invention, when the number of entries of data stored on the memory is the power of 2, the input digital signal can be normalized to be converted into a normalized entry number to be referred to from the memory, and data according to the input digital signal can be referred to.

Note that the objects of the present invention are also achieved by supplying a storage medium, which records a program code of a software program that can implement the functions of the above-mentioned embodiments to a system or apparatus. In this case, the functions are implemented when a computer (or a CPU or MPU) of the system or apparatus reads out and executes the program code stored in the storage medium. Note that, in this case, the storage medium which stores the program code constitutes the present invention.

As the storage medium for supplying the program code, for example, a hard disk, optical disk, magneto-optical disk, CD-ROM, CD-R, nonvolatile memory card and ROM may be used.

The present invention is not limited to a case wherein the functions of the above-mentioned embodiments are implemented when the computer executes the readout program code. For example, the present invention also includes a case wherein an OS (operating system) running on the computer executes some or all of actual processing operations on the basis of an instruction of the program code to implement the functions of the above-mentioned embodiments.

Furthermore, the present invention also includes a case wherein the functions of the above-mentioned embodiments are implemented after the program code read out from the storage medium is written in a memory of a function expansion board or a function expansion unit, which is inserted in or connected to the computer. That is, the present invention also includes a case wherein after the program code is written in the memory, a CPU or the like of the function expansion board or function expansion unit executes some or all of actual processing operations to implement the functions of the aforementioned embodiments.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2005-252676, filed Aug. 31, 2005, which is hereby incorporated by reference herein in its entirety.

What is claimed is:

1. A method of normalizing a P-bit input digital signal, which is expressed by binary notation, to $2^M-1$ ($0<M\leq P$) tones, executed by a normalizing apparatus operating on the P-bit input digital signal, the method comprising the step of:
repetitively concatenating, by the normalizing apparatus, upper M bits of the input digital signal L times (L is an integer) until P bits are reached;
comparing, by the normalizing apparatus, a concatenated signal obtained as a result of concatenation in the concatenating step with the input digital signal; and
determining, by the normalizing apparatus, a value indicated by the upper M bits or a value obtained by subtracting 1 from the value indicated by the upper M bits as a normalized value depending on a comparison result in the comparing step.

2. The method according to claim 1, further comprising the step of: generating, by the normalizing apparatus, a second concatenated signal by repetitively concatenating the normalized value until P bits are reached, and determining, by the normalizing apparatus, a value obtained by subtracting the second concatenated signal from the input digital signal as a fractional coordinate of a multi-dimensional interpolation calculation.

3. The method according to claim 1, wherein the determined normalized value is used by the normalizing apparatus in a multi-dimensional interpolation calculation for color space conversion.

4. The method according to claim 1, further comprising a step of modifying, by the normalizing apparatus, the one of the concatenated signal and the input digital signal so that the number of bits of the concatenated signal matches the number of bits of the input digital signal, wherein the one of the concatenated signal and the input digital signal modified in the modifying step is compared with the other one of the concatenated signal and the input digital signal in the comparing step.

5. The method according to claim 4, wherein the one of the input digital signal and the concatenated signal is not modified by the normalizing apparatus in the modifying step if the value of M×L−P is equal to the value of P.

6. The method according to claim 4, wherein lower M×L−P bits of the input digital signal is excluded from an LSB of the input digital signal by the normalizing apparatus in the modifying step.

7. The method according to claim 4, wherein upper M×L−P bits of the input digital signal is concatenated to an LSB of the input digital signal by the normalizing apparatus in the modifying step.

8. The method according to claim 7, further comprising the step of: determining, by the normalizing apparatus, a difference between the concatenated results obtained by concatenating the upper M bits of the input digital signal and by concatenating the upper M×L−P bits of the input digital signal or a value obtained by subtracting the difference between the concatenated results obtained by concatenating the upper M bits of the input digital signal and by concatenating the upper M×L−P bits of the input digital signal from a value generated by repetitively concatenating an M-bit value representing 1 the L times as a fractional coordinate of a multi-dimensional interpolation calculation depending on the comparison result in the comparing step.

9. An apparatus for normalizing a P-bit input digital signal, which is expressed by binary notation, to $2^M-1$ ($0<M\leq P$) tones, comprising:
a concatenating processor repetitively concatenating upper M bits of the input digital signal L times (L is an integer) until P bits are reached;
a comparing processor comparing a concatenated signal obtained as a result of concatenation by said concatenating processor with the input digital signal; and
a normalized value determination processor determining a value indicated by the upper M bits or a value obtained by subtracting 1 from the value indicated by the upper M bits as a normalized value depending on a comparison result of said comparing processor.

10. The apparatus according to claim 9, wherein said concatenating processor generates a second concatenated signal by repetitively concatenating the normalized value until P bits are reached, and further comprising a fractional coordinate determination processor determining a value obtained by subtracting the second concatenated signal from the input digital signal as a fractional coordinate of a multi-dimensional interpolation calculation.

11. The apparatus according to claim 9, wherein the determined normalized value is used in a multi-dimensional interpolation calculation for color space conversion.

12. The apparatus according to claim 9, wherein said concatenating processor modifies the one of the concatenated signal and the input digital signal so that the number of bits of the concatenated signal matches the number of bits of the input digital signal and said comparing processor compares the one of the concatenated signal and the input digital signal modified by said concatenating processor with the other one of the concatenated signal and the input digital signal.

13. The apparatus according to claim 12, wherein said concatenating processor does not modify the one of the input digital signal and the concatenated signal if the value of M×L−P is equal to the value of P.

14. The apparatus according to claim 12, wherein said concatenating processor excludes lower M×L−P bits of the input digital signal from an LSB of the input digital signal to match the number of bits of the concatenated signal and the input digital signal.

15. The apparatus according to claim 12, wherein the concatenating processor concatenates upper M×L−P bits of the input digital signal to an LSB of the input digital signal.

16. The apparatus according to claim 15, further comprising a determining processor for determining a difference between the concatenated results obtained by concatenating the upper M bits of the input digital signal and by concatenating the upper M×L−P bits of the input digital signal or a value obtained by subtracting the difference between the concatenated results obtained by concatenating the upper M bits of the input digital signal and by concatenating the upper M×L−P bits of the input digital signal from a value generated by repetitively concatenating an M-bit value representing 1 the L times as a fractional coordinate of a multi-dimensional interpolation calculation depending on the comparison result by said comparing processor.

17. A non-transitory computer readable storage medium that stores a computer program for normalizing a P-bit input digital signal, which is expressed by binary notation, to $2^M-1$ (0<M≦P) tones, and which normalized signal is used to generate a viewable image, said computer program comprising the step of:

repetitively concatenating upper M bits of the input digital signal L times (L is an integer) until P bits are reached;

comparing a concatenated signal obtained as a result of concatenation in the concatenating step with the input digital signal; and determining a value indicated by the upper M bits or a value obtained by subtracting 1 from the value indicated by the upper M bits as a normalized value depending on a comparison result in the comparing step.

18. The storage medium according to claim 17, further comprising the step of: generating a second concatenated signal by repetitively concatenating the normalized value until P bits are reached, and determining a value obtained by subtracting the second concatenated signal from the input digital signal as a fractional coordinate of a multi-dimensional interpolation calculation.

19. The storage medium according to claim 17, wherein the determined normalized value is used in a multi-dimensional interpolation calculation for color space conversion.

20. The storage medium according to claim 17, further comprising a step of modifying the one of the concatenated signal and the input digital signal so that the number of bits of the concatenated signal matches the number of bits of the input digital signal, wherein the one of the concatenated signal and the input digital signal modified in the modifying step is compared with the other one of the concatenated signal and the input digital signal in the comparing step.

21. The storage medium according to claim 20, wherein the one of the input digital signal and the concatenated signal is not modified in the modifying step if the value of M×L−P is equal to the value of P.

22. The storage medium according to claim 20, wherein lower M×L−P bits of the input digital signal is excluded from an LSB of the input digital signal in the modifying step.

23. The storage medium according to claim 20, wherein upper M×L−P bits of the input digital signal is concatenated to an LSB of the input digital signal in the modifying step.

24. The storage medium according to claim 23, further comprising the step of: determining a difference between the concatenated results obtained by concatenating the upper M bits of the input digital signal and by concatenating the upper M×L−P bits of the input digital signal or a value obtained by subtracting the difference between the concatenated results obtained by concatenating the upper M bits of the input digital signal and by concatenating the upper M×L−P bits of the input digital signal from a value generated by repetitively concatenating an M-bit value representing 1 the L times as a fractional coordinate of a multi-dimensional interpolation calculation depending on the comparison result in the comparing step.

* * * * *

UNITED STATES PATENT AND TRADEMARK OFFICE
CERTIFICATE OF CORRECTION

| | | |
|---|---|---|
| PATENT NO. | : 7,898,707 B2 | Page 1 of 1 |
| APPLICATION NO. | : 11/464223 | |
| DATED | : March 1, 2011 | |
| INVENTOR(S) | : Tadayuki Ito | |

It is certified that error appears in the above-identified patent and that said Letters Patent is hereby corrected as shown below:

Column 15, line 60, delete "tones" and insert --levels--

Column 16, line 30, delete "$M \times L - P$" and insert --$M \times L$--

Column 16, line 54, delete "tones" and insert --levels--

Column 17, lines 23-24, delete "$M \times L - P$" and insert --$M \times L$--

Column 17, line 49, delete "tones" and insert --levels--

Column 18, line 30, delete "$M \times L - P$" and insert --$M \times L$--

Signed and Sealed this
Sixth Day of December, 2011

David J. Kappos
*Director of the United States Patent and Trademark Office*